(12) United States Patent
Noda

(10) Patent No.: US 9,316,816 B2
(45) Date of Patent: *Apr. 19, 2016

(54) IMAGE PICKUP LENS

(71) Applicant: KANTATSU CO., LTD., Yaita-shi, Tochigi (JP)

(72) Inventor: Sayuri Noda, Sukagawa (JP)

(73) Assignee: KANTATSU CO., LTD., Toshigi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/584,141

(22) Filed: Dec. 29, 2014

(65) Prior Publication Data

US 2015/0116846 A1  Apr. 30, 2015

Related U.S. Application Data

(63) Continuation of application No. 13/864,702, filed on Apr. 17, 2013, now Pat. No. 8,953,256.

(30) Foreign Application Priority Data

Apr. 19, 2012 (JP) .................................. 2012-095388

(51) Int. Cl.
| | | |
|---|---|---|
| G02B 13/00 | (2006.01) | |
| G02B 9/60 | (2006.01) | |
| G02B 13/18 | (2006.01) | |
| G02B 3/04 | (2006.01) | |
| G02B 27/00 | (2006.01) | |

(52) U.S. Cl.
CPC .............. *G02B 13/0045* (2013.01); *G02B 3/04* (2013.01); *G02B 9/60* (2013.01); *G02B 13/18* (2013.01); *G02B 27/0025* (2013.01)

(58) Field of Classification Search
CPC .................................................. G02B 13/0045
USPC ......................................................... 359/714
See application file for complete search history.

(56) References Cited

U.S. PATENT DOCUMENTS

| | | |
|---|---|---|
| 8,179,614 B1 | 5/2012 | Tsai |
| 8,456,758 B1 | 6/2013 | Huang et al. |
| 8,488,258 B2 | 7/2013 | Shabtay et al. |
| 2010/0253829 A1 | 10/2010 | Shinohara |
| 2010/0254029 A1 | 10/2010 | Shinohara |
| 2011/0013069 A1 | 1/2011 | Chen |

FOREIGN PATENT DOCUMENTS

| | | |
|---|---|---|
| JP | 2009-294528 A | 12/2009 |
| JP | 2010-026434 A | 2/2010 |

*Primary Examiner* — Scott J Sugarman
(74) *Attorney, Agent, or Firm* — Westerman, Hattori, Daniels & Adrian, LLP

(57) ABSTRACT

An image pickup lens includes a first lens with positive refractive power having a convex object-side surface, a second lens with negative refractive power, a third meniscus lens having a concave image-side surface, a fourth meniscus lens having a convex image-side surface, and a fifth lens with negative refractive power as a double-sided aspheric lens having a concave object-side and image-side surfaces near an optical axis;

wherein following conditional expressions (9) and (12) are satisfied;

$$1.0 < |(r3+r4)/(r3-r4)| < 1.3 \qquad (9)$$

$$-1.1 < f2/f < -0.7 \qquad (12)$$

where r3 represents a curvature radius of an object-side surface of the second lens, r4 represents a curvature radius of an image-side surface of the second lens, f represents a focal length of an overall optical system of the image pickup lens, and f2 represents a focal length of the second lens.

10 Claims, 18 Drawing Sheets

FIG. 10
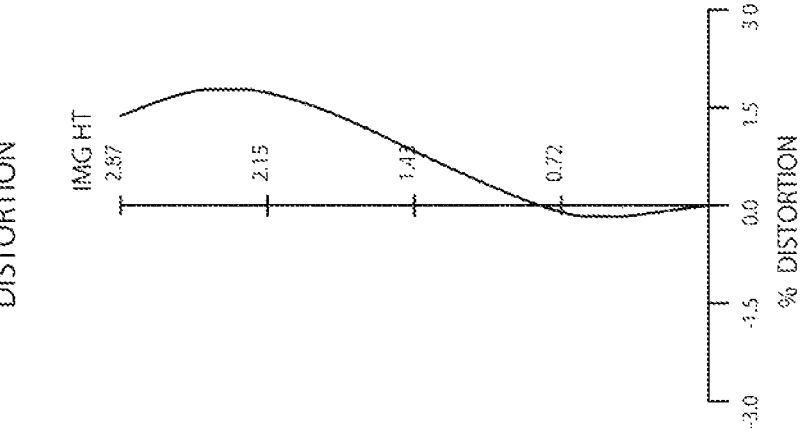
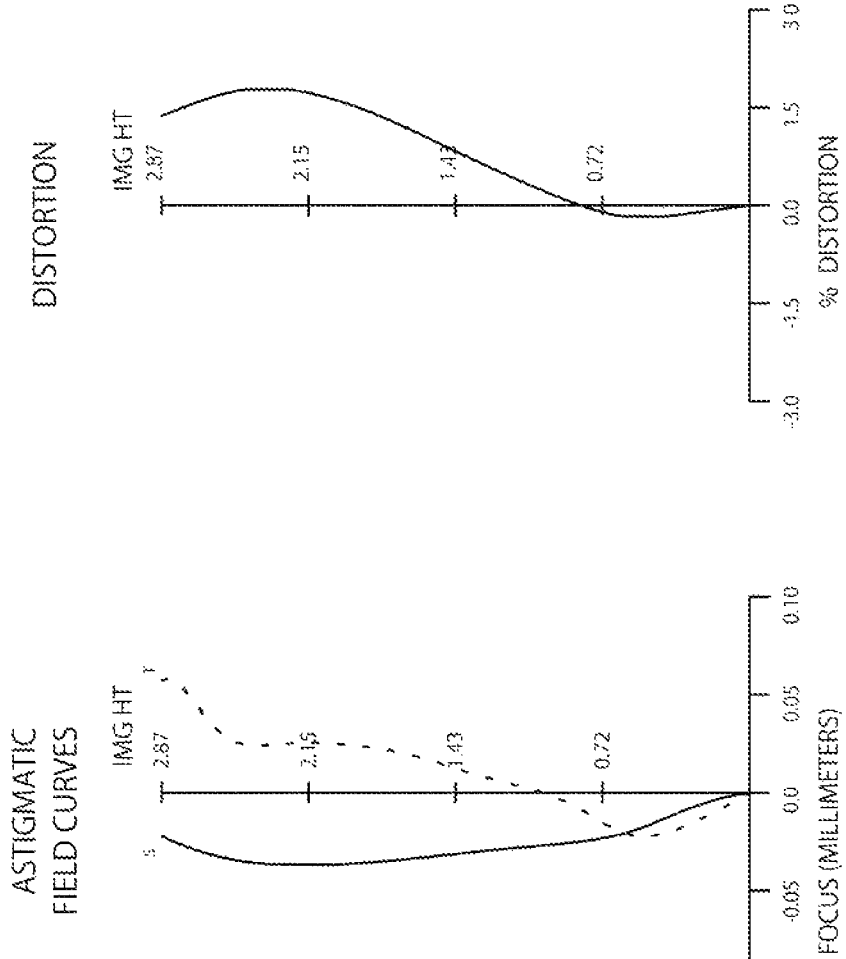
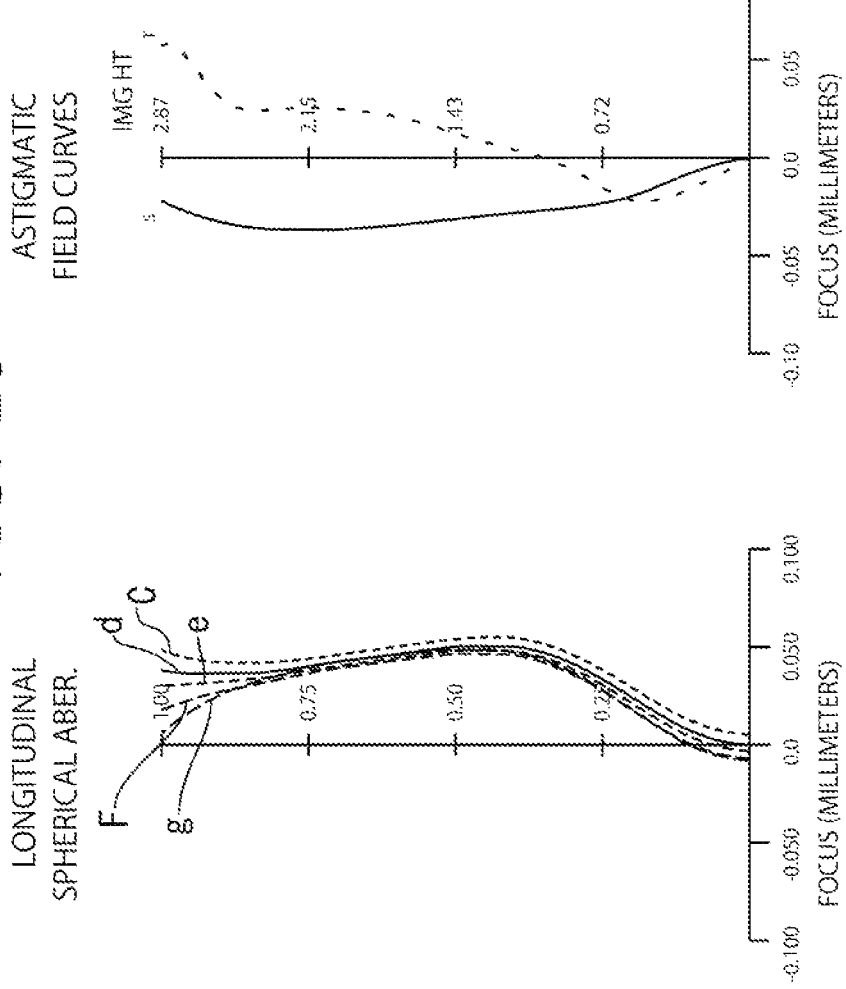

IMAGE PICKUP LENS

CROSS REFERENCE TO RELATED APPLICATION

This application is a continuation of U.S. application Ser. No. 13/864,702, filed on Apr. 17, 2013, the contents of which are incorporated herein by reference.

The present application is based on and claims priority of Japanese patent application No. 2012-095388 filed on Apr. 19, 2012, the entire contents of which are hereby incorporated by reference.

BACKGROUND OF THE INVENTION

1. Field of the Invention

The present invention relates to an image pickup lens for forming an image of an object on a solid imaging element such as a CCD sensor or a C-MOS sensor adopted in small-sized imaging devices. More specifically, the present invention relates to an image pickup lens composed of five lenses, which is built into an imaging device mounted on portable terminals such as cellular phones and smartphones, PDAs (Personal Digital Assistances), and game machines or information terminals such as personal computers and the like, where downsizing and thinning are pursued.

2. Description of the Related Art

Recently, the market of portable terminals having imaging devices has been expanding increasingly. Most portable terminals are equipped with a camera function. Currently, the majority of such camera functions has a large number of pixels comparable to that of digital cameras. Along with the increasing demands for thinning of portable terminals for reasons such as user-friendliness and design, demands for downsizing and thinning of the imaging devices built therein are also becoming severe. Further, as for the image pickup lens mounted on imaging devices adopting such imaging elements having a large number of pixels, there are demands for a lens system having even higher resolution, which is downsized, thinned and brighter (that is, with a small F-number). At the same time, there is also a strong demand for an imaging lens corresponding to a wide angle of field, which enables the camera to take an image of an object in a wide area.

Many image pickup lenses having a four-lens configuration have been proposed as the image pickup lens answering to such trend of downsizing, thinning and enhanced performance. However, in order to cope with further downsizing and increase in the number of pixels, many image pickup lenses having a five-lens configuration, capable of realizing a higher performance than the four-lens configuration, have been proposed. The present invention corresponds to such five-lens configuration.

For example, Japanese Patent Laid-Open No. 2009-294528 (Patent Document 1) discloses an image pickup lens having a five-lens configuration composed of, in order from an object side, a first lens having a positive power with an object-side surface formed to have a convex surface, a stop, a second lens having a meniscus shape near an optical axis, a third lens having an image-side surface formed to have a convex shape near the optical axis, a fourth lens having both sides thereof formed as aspherical surfaces and where a circumference portion of an image-side surface is formed to have a convex shape, and a fifth lens having both sides thereof formed as aspherical surfaces and where a circumference portion of an image-side surface is formed to have a convex shape, wherein only one of the second to fifth lenses is a negative lens having an Abbe number of 30 or smaller.

Further, Japanese Patent Laid-Open No. 2010-026434 (Patent Document 2) discloses an image pickup lens having a five-lens configuration composed of, in order from an object side, a positive first lens, a positive second lens, a negative third lens, a positive fourth lens, and a negative fifth lens.

According to the image pickup lens disclosed in Patent Document 1, the power of the first lens is weak, and the configuration is disadvantageous in achieving thinning of the image pickup lens. The ratio of diagonal length of the image pickup lens with respect to the total track length exceeds 1.0, which makes it difficult to satisfactorily correspond to imaging devices where demands for thinning are increasing. Further according to the disclosed image pickup lens, the F-number is approximately 3.0, which does not exactly ensure sufficient brightness corresponding to imaging elements having increasing number of pixels. As for the image pickup lens disclosed in Patent Document 2, the F-number is as bright as 2.05 to 2.5, and the lens system achieves a high aberration correction ability. However, the power of the first lens is weak, and therefore the configuration is disadvantageous in realizing thinning. The ratio of diagonal length of the imaging element with respect to the total track length is approximately 1.1, which makes it difficult to satisfactorily correspond to imaging devices having increasing demands for thinning, similar to Patent Document 1.

SUMMARY OF THE INVENTION

The present invention aims at solving the above-mentioned problems, by providing an image pickup lens which realizes thinning in a five-lens configuration, has a small F-number, is capable of correcting various aberrations satisfactorily, has a relatively wide angle of field, and enables to cope with cost reduction.

According to an aspect of the present invention, the image pickup lens is composed of five lenses having, in order from an object side to an image side, a first lens having a positive refractive power with a convex surface facing the object side, a second lens having a negative refractive power, a third lens as a meniscus lens with a concave surface facing the image side, a fourth lens as a meniscus lens with a convex surface facing the image side, and a fifth lens having both sides formed as aspherical surfaces and having a negative refractive power with a concave surface facing the object side and the image side near an optical axis; wherein conditional expressions (9) and (12) below are satisfied;

$$1.0 < |(r3+r4)/(r3-r4)| < 1.3 \quad (9)$$

$$-1.1 < f2/f < -0.7 \quad (12)$$

where r3 represents a curvature radius of an object-side surface of the second lens, r4 represents a curvature radius of an image-side surface of the second lens, f represents a focal length of an overall optical system of the image pickup lens, and f2 represents a focal length of the second lens. In the image pickup lens adopting the above configuration, if the first to fourth lenses out of the five-lens configuration are considered as a single group, the lens is configured so that the composite focal length (f1234) thereof becomes positive. Since the fifth lens arranged closest to the image side has a negative refractive power, if the lenses are considered in groups, it can be stated that the lens is composed of a positive first group of lenses and a negative second group. By adopting such configuration, it enables to reduce the length of the image pickup lens in the optical axis direction, that is, to reduce the total track length. Generally, a lens system having a small F-number (large diameter) has a drawback in that many aberrations tend to occur, and the corrections thereof are difficult. Especially, it was difficult to solve the problem of reducing the total track length while achieving a small F-number and improving the optical performances at the same time. According to the present invention, the total track length is shortened via a first lens having a positive refractive power with a convex surface facing the object side, and the second lens having a negative refractive power enables to correct chromatic aberration preferably, wherein the image-side surface of the second lens is formed as a convex surface, so that the output angle of the rays exiting the second lens is restrained and the aberration of marginal rays that tend to occur near the aperture stop is thereby suppressed. As a result, even by reducing the F-number, a preferable correction of aberration is achievable in an image pickup lens.

Conditional expression (9) defines the shape of the object-side surface and the image-side surface of the second lens, which is a condition for shortening the total track length and performing preferable correction of chromatic aberration while minimizing the sensitivity of production error. If the value falls below the lower limit of conditional expression (9), the negative refractive power of the object-side surface of the second lens becomes too strong, and the sensitivity of production error increases, leading to an unfavorable result. On the other hand, if the value exceeds the upper limit of conditional expression (9), the positive refractive power of the image-side surface of the second lens becomes strong, and the negative refractive power of the second lens weakens, therefore, it is effective in shortening the total track length; however, it is not preferable since chromatic aberration is deteriorated.

Conditional expression (12) is a condition for correcting the chromatic aberration while satisfactorily correcting the field curvature. If the value falls below the lower limit of conditional expression (12), the negative refractive power of the second lens in relation to the refractive power of the overall image pickup lens becomes too weak, leading to a difficulty in correcting the chromatic aberration. On the other hand, if the value exceeds the upper limit of conditional expression (12), the negative power of the second lens in relation to the refractive power of the overall image pickup lens becomes too strong, so that the correction of field curvature becomes difficult, the resolution performance around the imaging surface is greatly deteriorated, and leading to a disadvantage in the shortening of the total track length.

According to the image pickup lens having the above configuration, it is preferable that an aperture stop is arranged between the first lens and the second lens.

According to the image pickup lens having the above configuration, it is preferable that the second lens has a negative refractive power and a meniscus shape with a convex surface on the image side.

According to the image pickup lens having the above configuration, it is preferable that the third lens and the fourth lens each have a positive refractive power.

Preferably, the above image pickup lens satisfies the following conditional expressions (1), (2), and (3)

$$50 < v1 < 85 \quad (1)$$

$$20 < v2 < 35 \quad (2)$$

$$1.55 < Nd2 < 1.70 \quad (3)$$

where v1 represents an Abbe number of the first lens, v2 represents an Abbe number of the second lens, and Nd2 represents a refractive index of the second lens at d-ray.

Conditional expressions (1) and (2) define the Abbe numbers of the first lens and the second lens, wherein if the value falls below the lower limit of conditional expression (1) or if the value exceeds the upper limit of conditional expression (2), the correction of chromatic aberration becomes insufficient, and on the other hand, if the value exceeds the upper limit of conditional expression (1) or if the value falls below the lower limit of conditional expression (2), the correction becomes excessive. Preferable correction of chromatic aberration is enabled by satisfying both conditional expressions (1) and (2) simultaneously.

Conditional expression (3) defines the range of the refractive index of the second lens, and by defining the refractive index within such range, it enables to ensure a preferable performance while shortening the total track length. Further, by controlling the refractive index of the second lens to fall within the range of conditional expression (3), the lens surface of the second lens can have a gradual shape, so that the workability thereof can be improved. If the refractive index exceeds the upper limit of conditional expression (3), the cost of the lens materials is increased, and it results in disadvantage for cost reduction.

Regarding the Abbe number of the first and second lenses, it is even more preferable to satisfy the following conditional expression (4) in addition to conditional expressions (1) and (2).

$$2.0 < v1/v2 < 3.0 \quad (4)$$

Regarding the third lens having a positive refractive power, by forming the image-side surface as a concave surface, the distance measured through the air from the fourth lens can be set relatively long, and consequently, the field curvature can be corrected preferably.

Regarding the fourth lens having a positive refractive power, by forming the image-side surface as a convex surface and by providing an appropriate power thereto, it enables to shorten the total track length and to ensure back focus easily.

Regarding the fifth lens, by providing an appropriate negative power, it becomes possible to ensure an appropriate back focus easily, and by forming the image-side surface as a concave surface, the various aberrations at the center of the image plane can be corrected satisfactorily.

In the image pickup lens having the above configuration, the fourth lens should preferably have a meniscus shape near the optical axis, and an image-side surface formed of an aspherical surface having a positive refractive power that weakens toward the circumference. By adopting such shape in the fourth lens, it enables to favorably correct various off-axis aberrations, such as the field curvature, the distortion and the chromatic aberration of magnification.

Further, according to the image pickup lens having the above configuration, the fifth lens should preferably have both surfaces formed as concave surfaces, having no pole-change point on the aspheric surface of the object side and having a pole-change point at a position other than on the optical axis on the aspherical surface of the image-side surface. By forming the object-side surface of the fifth lens as a concave surface with no pole-change point, the circumferential shape of the image-side surface can be moved easily toward the object side, so that the distance from the area of the image-side surface of the fifth lens that projects most toward the image side to an imaging surface can be easily ensured. Further, by providing a pole-change point at a position other than on the optical axis on the image-side surface, it enables to restrain the angle of incidence of rays to the imaging surface and to enhance telecentric properties. Here, the term pole-change point refers to a point on the aspherical surface where a tangential plane crosses the optical axis perpendicularly.

Further, the image pickup lens having the above configuration preferably satisfies the following conditional expressions (5), (6) and (7):

$$20 < v3 < 30 \tag{5}$$

$$50 < v4 < 60 \tag{6}$$

$$1.5 < Nd3 < 1.7 \tag{7}$$

where v3 represents an Abbe number of the third lens, v4 represents an Abbe number of the fourth lens, and Nd3 represents a refractive index of the third lens at d-ray.

Conditional expressions (5) and (6) are conditions for further preferably correcting the chromatic aberration, wherein if the value falls below the lower limit of conditional expression (5) or if the value exceeds the upper limit of conditional expression (6), the correction of chromatic aberration tends to be excessive. On the other hand, if the value exceeds the upper limit of conditional expression (5) or if the value falls below the lower limit of conditional expression (6), the correction of chromatic aberration tends to be insufficient. By satisfying conditional expressions (5) and (6) simultaneously, it becomes possible to correct chromatic aberration also via the third and fourth lenses.

Conditional expression (7) is a condition for preferably correcting the axial chromatic aberration together with conditional expressions (5) and (6). If the value falls below the lower limit of conditional expression (7), the positive refractive power of the third lens becomes too weak, and the field curvature is deteriorated, leading to an unfavorable result. On the other hand, if the value exceeds the upper limit, the positive refractive power of the third lens becomes too strong, leading to a difficulty in correcting the axial chromatic aberration. Further, since the cost of the lens material increases, cost reduction becomes difficult to be achieved.

Regarding the Abbe numbers of the third and fourth lenses, it is more preferable to satisfy the following conditional expression (8) together with the above-mentioned conditional expressions (5) and (6).

$$1.8 < v4/v3 < 2.5 \tag{8}$$

The image pickup lens having the above configuration should preferably satisfy the following conditional expression (10) regarding the shapes of the image-side surface of the first lens and the object-side surface of the second lens:

$$1.7 < r2/r3 < 6.0 \tag{10}$$

where r2 represents a curvature radius of an image-side surface of the first lens, and r3 represents a curvature radius of the object-side surface of the second lens.

Conditional expression (10) is a condition for suppressing chromatic aberration, field curvature, and sensitivity of production error. If the value falls below the lower limit of conditional expression (10), the curvature radius of the object-side surface of the second lens becomes too high in relation to the curvature radius of the image-side surface of the first lens, resulting in an unfavorable balance of the refractive power of the first lens and that of the second lens, and the chromatic aberration tends to be deteriorated, which is not preferable. On the other hand, if the value exceeds the upper limit of conditional expression (10), the curvature radius of the image-side surface of the first lens becomes too high in relation to the curvature radius of the object-side surface of the second lens, and in that case, the curvature radius of the object-side surface of the first lens must be reduced in order to maintain the refractive power of the first lens, so as a result, the sensitivity of production error of the first lens becomes high, and an unfavorable result would be obtained. Moreover, if the value exceeds the upper limit of conditional expression (10), the negative refractive power of the object-side surface of the second lens becomes too strong, and it leads to a difficulty in correcting the field curvature.

Generally, by arranging the aperture stop closest to the object side, the exit pupil position can be placed away from the imaging surface, so that the image-side telecentric properties can be enhanced. However, if the aperture stop is arranged closest to the object side, the symmetric property of the respective lenses with respect to the stop will be lost, and aberration correction may become difficult. According to the present invention, by arranging the aperture stop between the first lens and the second lens, it enables to improve the symmetry of the optical system with respect to the stop compared to when the aperture stop is arranged closest to the object side. Therefore, the present invention enables to perform preferable correction of various aberrations caused by increasing the effective diameter of the lens when the F-number is reduced.

Further, the image pickup lens having the above configuration should preferably satisfy the following conditional expression (11):

$$0.5 < f1/f < 0.8 \tag{11}$$

where f represents a focal length of the overall optical system of the image pickup lens, and f1 represents a focal length of the first lens.

Conditional expression (11) is a condition for suppressing the occurrence of spherical aberration while reducing the distance of the image pickup lens in the optical axis direction, and reducing the sensitivity of production error.

If the value falls below the lower limit of conditional expression (11), the positive refractive power of the first lens in relation to the refractive power of the overall image pickup lens becomes too strong, leading to a difficulty in correcting the various aberrations, especially spherical aberration. Further, since the configuration becomes too sensitive with respect to production error, whereby the assembly accuracy is deteriorated, leading to an unfavorable result. On the other hand, if the upper limit of conditional expression (11) is exceeded, the positive refractive power of the first lens in relation to the refractive power of the overall image pickup lens system becomes too weak, so that it is advantageous from the viewpoint of correction of spherical aberration and reduction of sensitivity of production error, however it is disadvantageous from the viewpoint of reducing the total track length.

Furthermore, the image pickup lens having the above configuration should preferably satisfy the following conditional expression (13):

$$0.5 < f4/f < 0.7 \tag{13}$$

where f represents a focal length of the overall optical system of the image pickup lens, and f4 represents a focal length of the fourth lens.

By designing the image-side surface of the fourth lens as an aspherical shape in which the positive refractive power weakens as the lens surface approximates the circumference, various aberrations in a high image height, especially the field curvature and the distortion can be corrected satisfactorily. Further, the telecentric property can be ensured easily. Moreover, conditional expression (13) is a condition for reducing the total track length while ensuring back focus, wherein if the value falls below the lower limit of conditional expression (13), the positive refractive power of the fourth lens in relation to the refractive power of the overall image pickup lens becomes too strong, which is advantageous from the viewpoint of shortening the total track length, however it becomes difficult to ensure an appropriate back focus, creating difficulty in ensuring enough space for arranging an IR cut filter or the like for cutting infrared light harmful to the imaging elements. On the other hand, if the value exceeds the upper limit of conditional expression (13), the positive refractive power of the fourth lens in relation to the refractive power of the overall image pickup lens system becomes too weak, so that an appropriate back focus can be ensured easily, however, it is disadvantageous from the viewpoint of shortening the total track length, and therefore, it is unfavorable.

The term total track length in the present invention refers to the distance on the optical axis from the object-side surface of the first lens to the image plane when the optical elements are removed. Here, the optical element is the IR cut filter or the like arranged between the image pickup lens and the solid imaging element such as the CCD or the C-MOS sensor.

BRIEF DESCRIPTION OF THE DRAWINGS

FIG. 10 is a view showing a spherical aberration, an astigmatism and a distortion of the image pickup lens according to Embodiment 5;

DETAILED DESCRIPTION OF THE PREFERRED EMBODIMENTS

Now, preferred embodiments of the present invention will be described in detail with reference to the drawings.

FIG. 1, FIG. 3, FIG. 5, FIG. 7, FIG. 9, FIG. 11, FIG. 13, FIG. 15 and FIG. 17, respectively, are general configuration diagrams of Embodiments 1 through 9 of the present embodiment. The basic lens configuration is the same in all embodiments, so an explanation is given on the image pickup lens configuration of the present embodiment with reference to the general configuration diagram of Embodiment 1.

Figure 1:
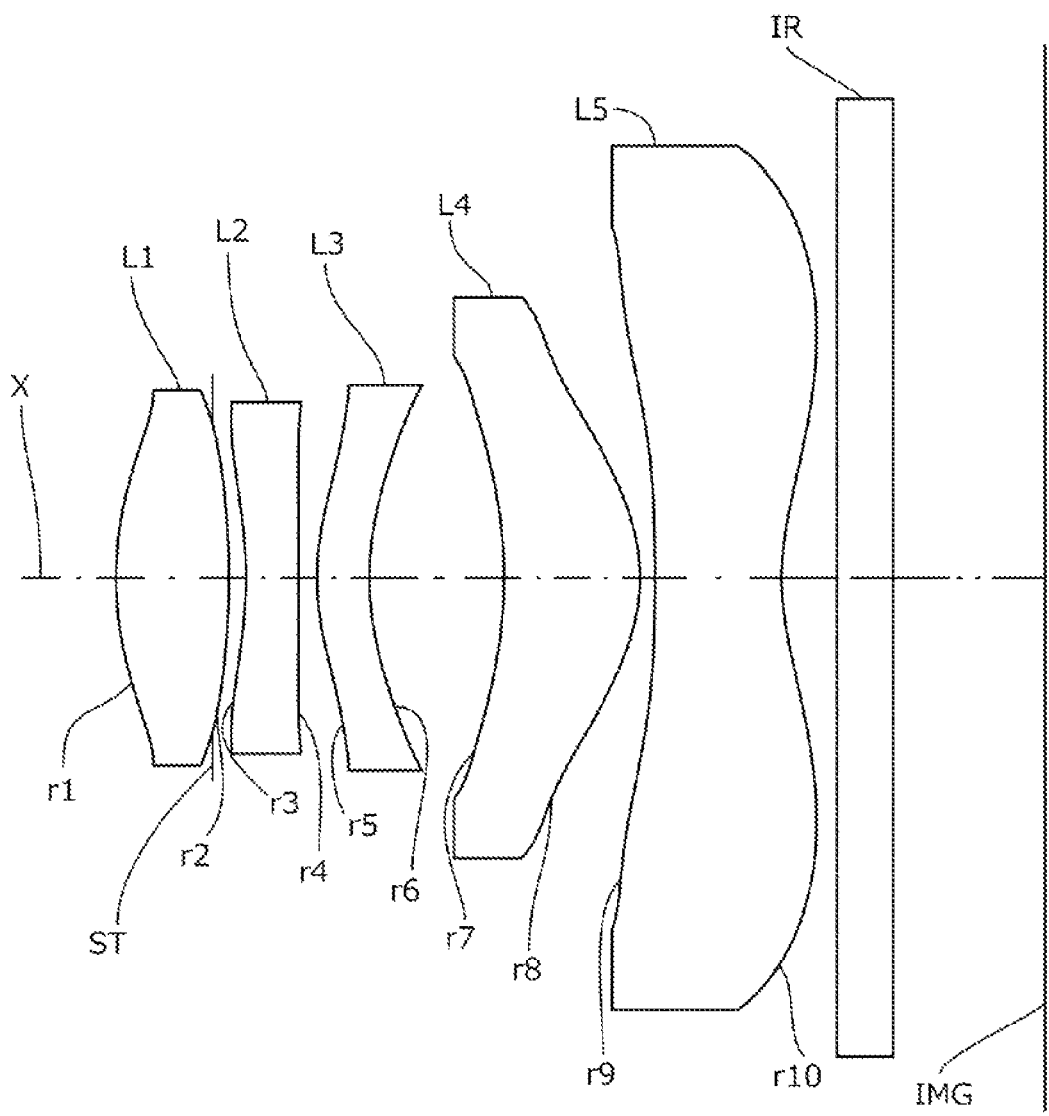
FIG. 1 is a diagram showing a general configuration of an image pickup lens according to Embodiment 1.

As is shown in FIG. 1, an image pickup lens of the present embodiment is composed of, in order from an object side to an image plane side, a first lens L1 having a positive refractive power, an aperture stop ST, a second lens L2 having a negative refractive power, a third lens L3 having a positive refractive power, a fourth lens L4 having a positive refractive power, and a fifth lens L5 having a negative refractive power. An aperture stop ST is arranged on an image side of the first lens L1. A filter IR is arranged between the fifth lens L5 and an image plane IMG. The filter IR can be omitted.

In the image pickup lens having the above-mentioned five-lens configuration, a first lens L1 is a biconvex lens with both an object-side surface r1 and an image-side surface r2 being a convex surface. A second lens L2 is a meniscus lens with an object-side surface r3 of a concave surface and an image-side surface r4 of a convex surface. A third lens L3 is a meniscus lens with an object-side surface r5 of a convex surface and an image-side surface r6 of a concave surface. A fourth lens L4 is a meniscus lens with an object-side surface r7 of a concave surface near the optical axis x and an image-side surface r8 of a convex surface, wherein the image-side surface r8 is composed of an aspherical surface where positive refractive power weakens toward the circumference. A fifth lens L5 is a biconcave lens with an object-side surface r9 of a concave surface near the optical axis X and an image-side surface r10 of a concave surface, wherein the aspherical surface of the image-side surface r10 has a pole-change point that is positioned other than on the optical axis X.

Further, the image pickup lens is configured so that a composite focal length (f1234) of the first lens L1, the second lens L2, the third lens L3 and the fourth lens L4 becomes a positive value, with the aim to shorten the total track length. Moreover, regarding the first lens L1 to the fourth lens L4, the first lens L1 having a positive refractive power with a convex surface facing the object side aims to shorten the total track length, while the second lens L2 having a negative refractive power preferably corrects chromatic aberration, and by forming the image-side surface r4 of the second lens L2 as a convex surface, the output angle of the rays exiting the second lens L2 can be suppressed, so that the aberration of marginal rays that tend to occur near the aperture stop ST is suppressed. As a result, the configuration enables to reduce the F-number to a value as small as approximately 2.2.

The image-side surface r6 of the third lens L3 having a positive refractive power is formed as a concave surface to widen the air distance from the fourth lens L4, to thereby preferably correct the field curvature.

The image-side surface r8 of the fourth lens L4 having a positive refractive power is formed as an aspheric surface in which the positive refractive power weakens toward the circumference, so that the off-axis field curvature, the distortion and the chromatic aberration of magnification can be satisfactorily corrected and the telecentric properties can be ensured easily. Further, the fifth lens L5 having both surfaces formed as concave surfaces is adopted, so that an appropriate back focus can be ensured and various aberrations at the center of the imaging surface can be preferably corrected.

Further, the object-side surface r9 of the fifth lens L5 is an aspheric surface having no pole-change point, but the image-side surface r10 thereof is an aspheric surface having a pole-change point at a position other than on the optical axis X. Since the object-side surface r9 of the fifth lens is designed as a concave surface with no pole-change point, the total track length can be shortened while back focus can be easily ensured, and since the image-side surface r10 has a pole-change point at a position other than on the optical axis X, the telecentric properties of the angle of incidence of rays on the imaging surface can be easily ensured.

The image pickup lens according to the present invention satisfies the following conditional expressions (1) through (13).

$$50 < v1 < 85 \tag{1}$$

$$20 < v2 < 35 \tag{2}$$

$$1.55 < Nd2 < 1.70 \tag{3}$$

$$2.0 < v1/v2 < 3.0 \tag{4}$$

$$20 < v3 < 30 \tag{5}$$

$$50 < v4 < 60 \tag{6}$$

$$1.5 < Nd3 < 1.7 \tag{7}$$

$$1.8 < v4/v3 < 2.5 \tag{8}$$

$$1.0 < |(r3+r4)/(r3-r4)| < 1.3 \tag{9}$$

$$1.7 < r2/r3 < 6.0 \tag{10}$$

$$0.5 < f1/f < 0.8 \tag{11}$$

$$-1.1 < f2/f < -0.7 \tag{12}$$

$$0.5 < f4/f < 0.7 \tag{13}$$

where
v1: Abbe number of the first lens
v2: Abbe number of the second lens
v3: Abbe number of the third lens
v4: Abbe number of the fourth lens
Nd2: refractive index of d-ray of the second lens
Nd3: refractive index of d-ray of the third lens
r2: curvature radius of image-side surface of the first lens
r3: curvature radius of object-side surface of the second lens
r4: curvature radius of image-side surface of the second lens
f: focal length of the overall optical system of the image pickup lens
f1: focal length of the first lens
f2: focal length of the second lens
f4: focal length of the fourth lens In the present embodiment, the lens surfaces of all lenses are formed of aspherical surfaces. The aspherical shape adopted in these lens surfaces is represented by the following expression, when an axis in the optical axis direction is denoted as Z, a height in a direction orthogonal to the optical axis is denoted as H, a conic constant is denoted as k, and aspherical coefficients are denoted as A4, A6, A8, A10, A12, A14 and A16.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} \qquad \text{Equation 1}$$

Next, preferred embodiments of the image pickup lens according to the present embodiments are shown. In each embodiment, f represents a focal length of the overall image pickup lens system, Fno represents an F-number, ω represents a half angle of field, and IH represents a maximum image height. Further, i represents a surface number counted from the object side, r represents a curvature radius, d represents a distance between lens surfaces on the optical axis (surface distance), Nd represents a refractive index with respect to d-ray (reference wavelength), and vd represents an Abbe number with respect to the d-ray. Aspherical surface will be shown with a sign (asterisk) after the surface number i.

Embodiment 1

Basic lens data will be shown in Table 1 below.

TABLE 1

Embodiment 1

Unit mm f = 4.114
Fno = 2.25
ω = 35.54
IH = 2.87

Surface data

| Surface No. i | Curvature radius r | Surface distance d | Refractive index Nd | Abbe number vd |
|---|---|---|---|---|
| (Object surface) | Infinity | Infinity | | |
| 1* | 1.845 | 0.607 | 1.5346 | 56.16 |
| 2* (Stop) | −4.394 | 0.095 | | |
| 3* | −2.109 | 0.280 | 1.6355 | 23.91 |
| 4* | −320.133 | 0.101 | | |
| 5* | 1.388 | 0.280 | 1.6355 | 23.91 |

TABLE 1-continued

Embodiment 1

| | | | | |
|---|---|---|---|---|
| 6* | 1.583 | 0.727 | | |
| 7* | −2.470 | 0.733 | 1.5346 | 56.16 |
| 8* | −0.977 | 0.080 | | |
| 9* | −10.888 | 0.682 | 1.5094 | 55.87 |
| 10* | 1.378 | 0.3 | | |
| 11 | Infinity | 0.3 | 1.5168 | 64.17 |
| 12 | Infinity | 0.817 | | |
| Image Plane | Infinity | | | |

Single lens data

| Lens | Start plane | Focal length |
|---|---|---|
| 1 | 1 | 2.516 |
| 2 | 3 | −3.342 |
| 3 | 5 | 11.383 |
| 4 | 7 | 2.583 |
| 5 | 9 | −2.357 |

Aspheric data

| | 1st surface | 2nd surface | 3rd surface | 4th surface | 5th surface |
|---|---|---|---|---|---|
| k | 9.747E−01 | 0.000E+00 | 0.000E+00 | 0.000E+00 | 0.000E+00 |
| A4 | −5.756E−02 | 2.349E−02 | 3.022E−01 | −8.604E−03 | −3.013E−01 |
| A6 | 2.002E−02 | −8.065E−02 | −3.503E−01 | 1.116E−02 | 1.126E−01 |
| A8 | −1.532E−01 | 5.641E−02 | 3.165E−01 | 1.753E−02 | −3.369E−01 |
| A10 | 1.682E−01 | −6.549E−02 | 7.612E−02 | −1.747E−02 | 4.998E−01 |
| A12 | −1.595E−01 | 2.926E−02 | −4.527E−01 | 7.247E−02 | −2.571E−01 |
| A14 | 4.881E−02 | 3.643E−02 | 4.778E−01 | −5.004E−02 | 2.863E−02 |
| A16 | 5.531E−03 | −3.078E−02 | −1.845E−01 | −6.621E−03 | −3.037E−03 |

| | 6th surface | 7th surface | 8th surface | 9th surface | 10th surface |
|---|---|---|---|---|---|
| k | 0.000E+00 | 0.000E+00 | −6.302E−01 | 0.000E+00 | −8.778E+00 |
| A4 | −1.308E−02 | 2.594E−02 | 2.636E−01 | −5.715E−02 | −8.884E−02 |
| A6 | −2.645E−01 | 3.287E−03 | −1.899E−01 | 9.650E−03 | 4.785E−02 |
| A8 | 2.232E−01 | −3.194E−02 | 1.494E−01 | 1.923E−02 | −2.236E−02 |
| A10 | 2.465E−02 | 1.374E−01 | −3.427E−02 | −1.110E−02 | 7.197E−03 |
| A12 | −9.559E−02 | −1.820E−01 | 4.925E−04 | 2.512E−03 | −1.491E−03 |
| A14 | 3.916E−02 | 1.071E−01 | −2.252E−03 | −2.322E−04 | 1.763E−04 |
| A16 | −5.041E−03 | −2.666E−02 | 9.666E−04 | 2.125E−06 | −9.004E−06 |

The image pickup lens according to Embodiment 1 satisfies all conditional expressions (1) through (13), as shown in Table 11.

Figure 2:
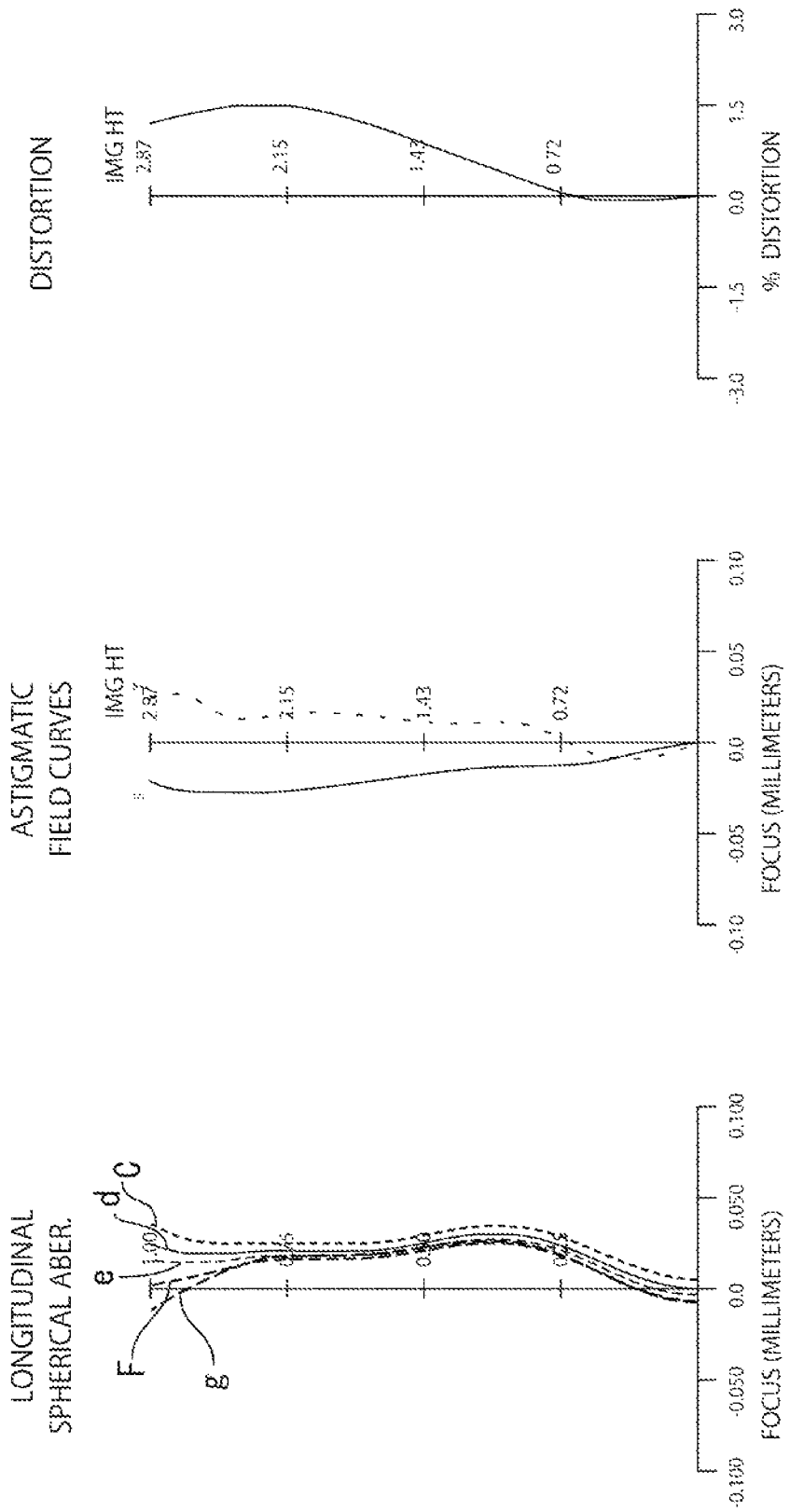
FIG. 2 is a view showing a spherical aberration, an astigmatism and a distortion of the image pickup lens according to Embodiment 1.
Figure 3:
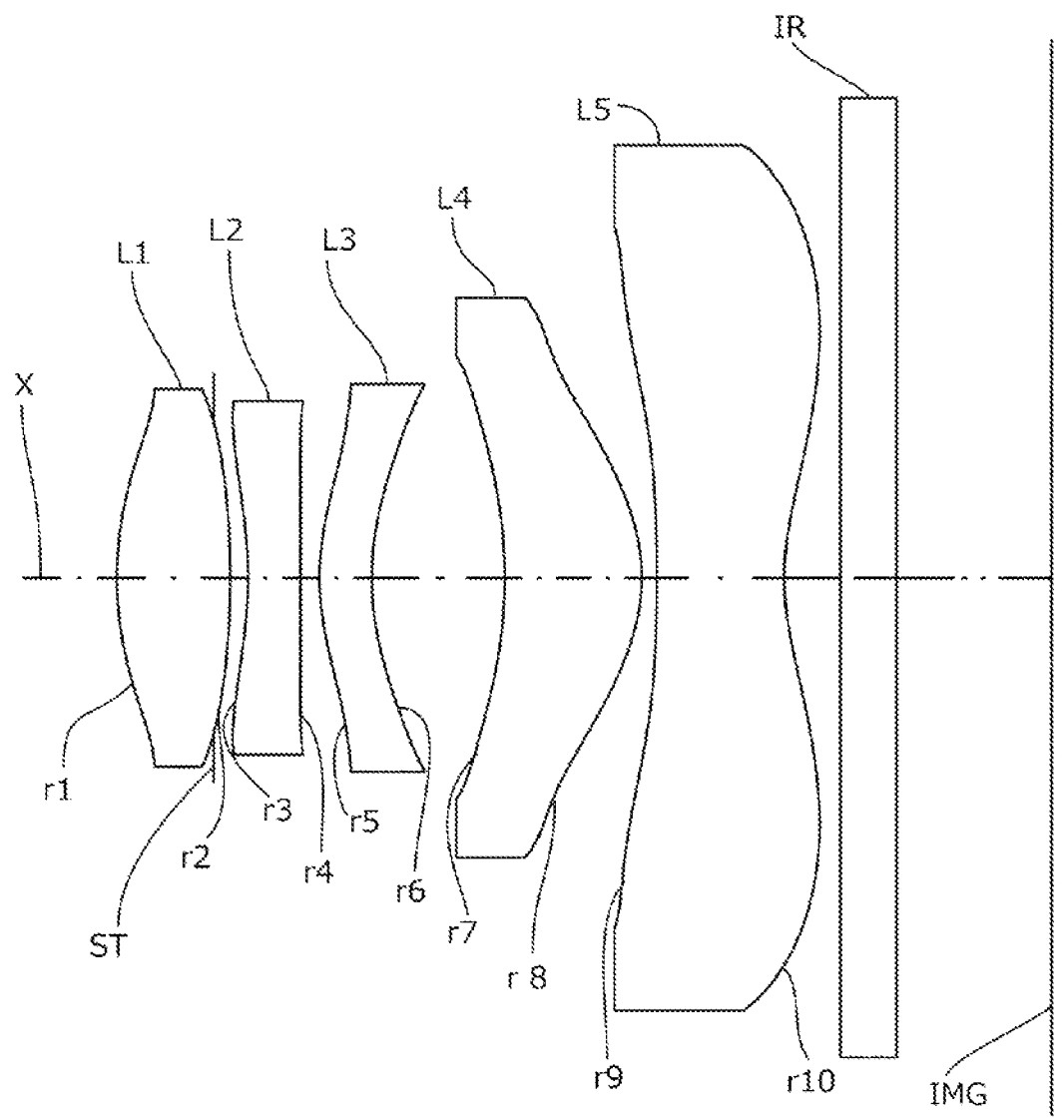
FIG. 3 is a view showing a general configuration of the image pickup lens according to Embodiment 2.

FIG. 2 shows a spherical aberration (mm), an astigmatism (mm), and a distortion (%) of the image pickup lens according to Embodiment 1. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 2, it can be seen that the respective aberrations are satisfactorily corrected.

Further, the total track length TTL is as short as 4.880 mm and the ratio thereof to the maximum image height IH (TTL/2IH) is 0.850, so that downsizing is realized even in a five-lens configuration. Moreover, the F-number is as bright as 2.25, and the half angle of field is approximately 35°, which means that a comparatively wide angle of field is realized.

Regarding the materials of the respective lenses according to Embodiment 1, the first lens L1 adopts a glass material, the second lens L2 and the third lens L3 adopt a polycarbonate-based plastic material, and the fourth lens L4 and the fifth lens L5 adopt a cycloolefin-based plastic material. Cost reduction is enabled by using much plastic materials.

Embodiment 2

Basic lens data will be shown in Table 2 below.

TABLE 2

| Embodiment 2 |
|---|
| Unit mm |
| f = 4.113 |
| Fno = 2.25 |
| ω = 34.48 |
| IH = 2.87 |

TABLE 2-continued

Embodiment 2

Surface data

| Surface No. i | Curvature radius r | Surface distance d | Refractive index Nd | Abbe number vd |
|---|---|---|---|---|
| (Object surface) | Infinity | Infinity | | |
| 1* | 1.845 | 0.608 | 1.5346 | 56.16 |
| 2* (Stop) | −4.393 | 0.095 | | |
| 3* | −2.102 | 0.280 | 1.6355 | 23.91 |
| 4* | −212.277 | 0.101 | | |
| 5* | 1.388 | 0.280 | 1.6355 | 23.91 |
| 6* | 1.583 | 0.712 | | |
| 7* | −2.469 | 0.733 | 1.5346 | 56.16 |
| 8* | −0.977 | 0.080 | | |
| 9* | −10.894 | 0.682 | 1.5094 | 55.87 |
| 10* | 1.378 | 0.3 | | |
| 11 | Infinity | 0.3 | 1.5168 | 64.17 |
| 12 | Infinity | 0.830 | | |
| Image Plane | Infinity | | | |

Single lens data

| Lens | Start plane | Focal length |
|---|---|---|
| 1 | 1 | 2.516 |
| 2 | 3 | −3.343 |
| 3 | 5 | 11.381 |
| 4 | 7 | 2.583 |
| 5 | 9 | −2.357 |

Aspheric data

| | 1st surface | 2nd surface | 3rd surface | 4th surface | 5th surface |
|---|---|---|---|---|---|
| k | 9.842E−01 | 0.000E+00 | 0.000E+00 | 0.000E+00 | 0.000E+00 |
| A4 | −5.715E−02 | 2.348E−02 | 3.012E−01 | −8.405E−03 | −3.014E−01 |
| A6 | 2.102E−02 | −8.071E−02 | −3.507E−01 | 1.011E−02 | 1.130E−01 |
| A8 | −1.530E−01 | 5.640E−02 | 3.163E−01 | 1.695E−02 | −3.377E−01 |
| A10 | 1.676E−01 | −6.562E−02 | 7.621E−02 | −1.728E−02 | 4.988E−01 |
| A12 | −1.602E−01 | 2.901E−02 | −4.525E−01 | 7.311E−02 | −2.576E−01 |
| A14 | 4.858E−02 | 3.630E−02 | 4.780E−01 | −4.959E−02 | 2.886E−02 |
| A16 | 6.101E−03 | −3.029E−02 | −1.844E−01 | −7.202E−03 | −2.165E−03 |

| | 6th surface | 7th surface | 8th surface | 9th surface | 10th surface |
|---|---|---|---|---|---|
| k | 0.000E+00 | 0.000E+00 | −6.299E−01 | 0.000E+00 | −8.705E+00 |
| A4 | −1.270E−02 | 2.622E−02 | 2.635E−01 | −5.715E−02 | −8.875E−02 |
| A6 | −2.650E−01 | 3.260E−03 | −1.898E−01 | 9.641E−03 | 4.784E−02 |
| A8 | 2.230E−01 | −3.201E−02 | 1.494E−01 | 1.923E−02 | −2.236E−02 |
| A10 | 2.457E−02 | 1.373E−01 | −3.424E−02 | −1.110E−02 | 7.197E−03 |
| A12 | −9.562E−02 | −1.820E−01 | 5.057E−04 | 2.512E−03 | −1.491E−03 |
| A14 | 3.920E−02 | 1.071E−01 | −2.247E−03 | −2.322E−04 | 1.763E−04 |
| A16 | −4.937E−03 | −2.652E−02 | 9.662E−04 | 2.142E−06 | −9.006E−06 |

The image pickup lens according to Embodiment 2 satisfies all conditional expressions (1) through (13), as shown in Table 11.

Figure 4:
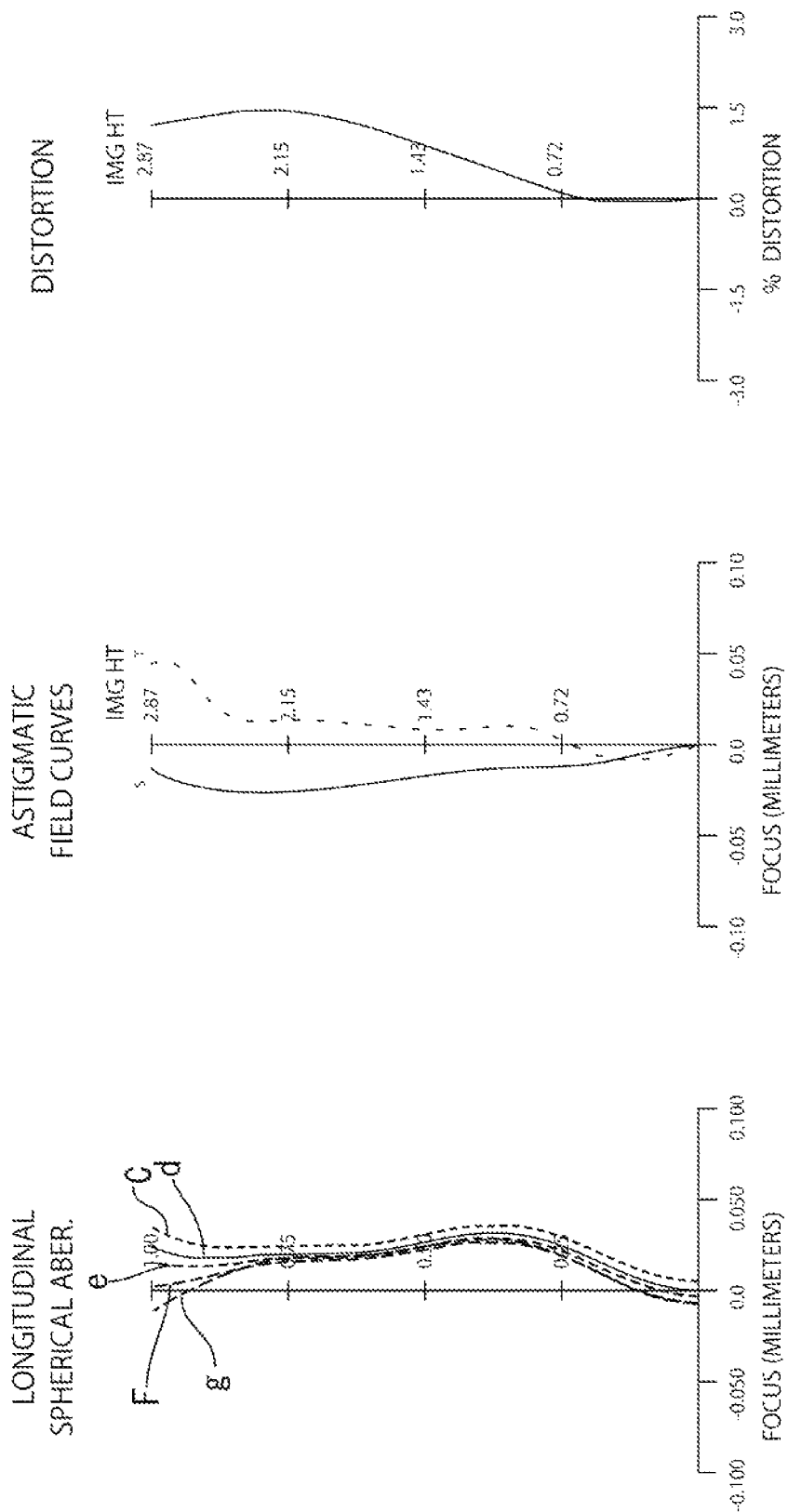
FIG. 4 is a view showing a spherical aberration, an astigmatism and a distortion of the image pickup lens according to Embodiment 2.
Figure 5:
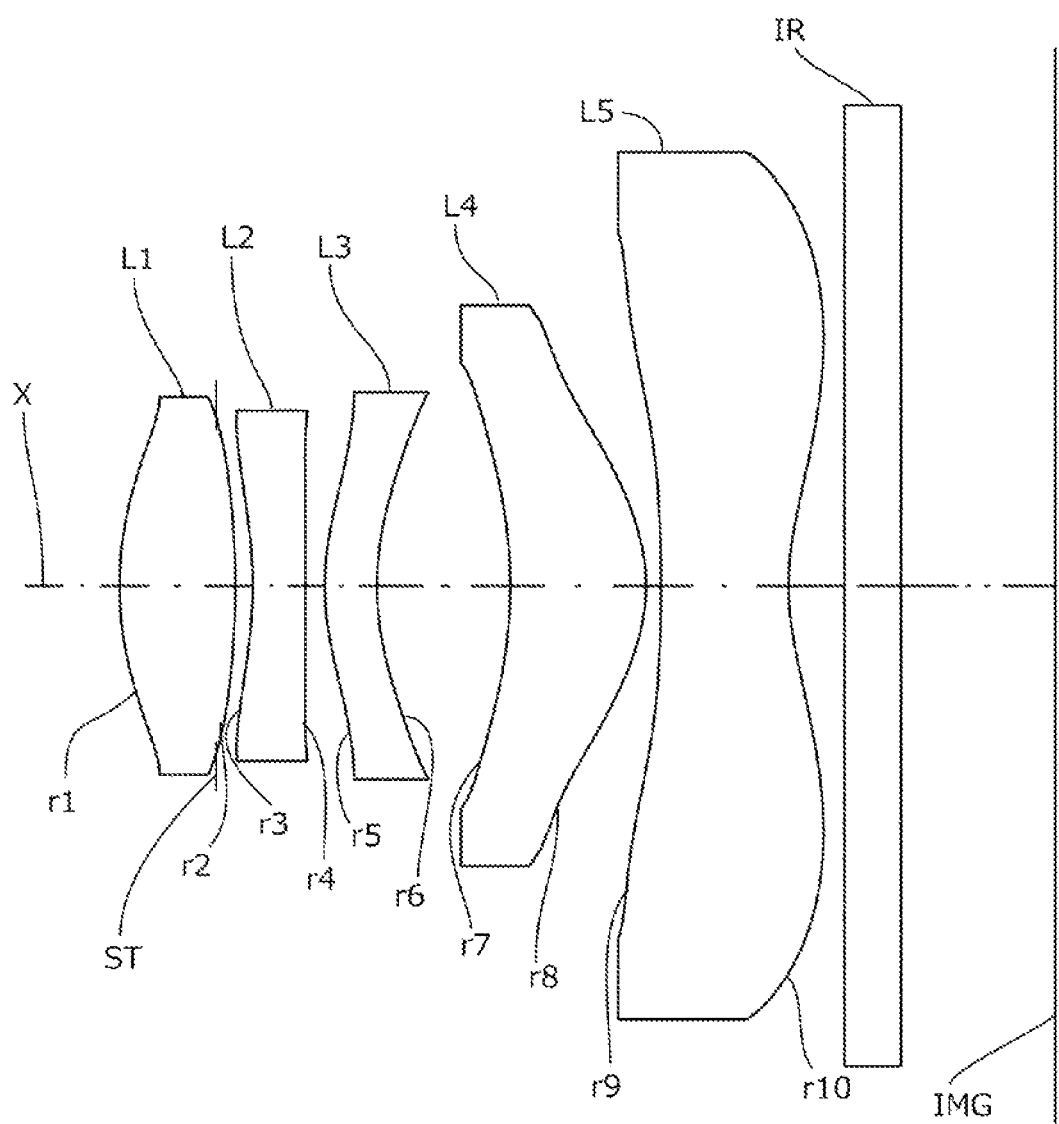
FIG. 5 is a view showing a general configuration of the image pickup lens according to Embodiment 3.

FIG. 4 shows a spherical aberration (mm), an astigmatism (mm), and a distortion (%) of the image pickup lens according to Embodiment 2. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 4, it can be seen that the respective aberrations are satisfactorily corrected.

Further, the total track length TTL is as short as 4.878 mm and a ratio thereof to the maximum image height IH (TTL/2IH) is 0.850, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 2, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Embodiment 3

Basic lens data will be shown in Table 3 below.

TABLE 3

Embodiment 3

Unit mm f = 4.106
Fno = 2.25
ω = 34.48
IH = 2.87

Surface data

| Surface No. i | Curvature radius r | Surface distance d | Refractive index Nd | Abbe number νd |
|---|---|---|---|---|
| (Object surface) | Infinity | Infinity | | |
| 1* | 1.810 | 0.619 | 1.5346 | 56.16 |
| 2* (Stop) | −4.610 | 0.094 | | |
| 3* | −2.073 | 0.280 | 1.6355 | 23.91 |
| 4* | −87.461 | 0.102 | | |
| 5* | 1.407 | 0.280 | 1.6355 | 23.91 |
| 6* | 1.608 | 0.712 | | |
| 7* | −2.470 | 0.724 | 1.5346 | 56.16 |
| 8* | −0.977 | 0.079 | | |
| 9* | −10.924 | 0.681 | 1.5094 | 55.87 |
| 10* | 1.380 | 0.3 | | |
| 11 | Infinity | 0.3 | 1.5168 | 64.17 |
| 12 | Infinity | 0.824 | | |
| Image Plane | Infinity | | | |

Single lens data

| Lens | Start plane | Focal length |
|---|---|---|
| 1 | 1 | 2.515 |
| 2 | 3 | −3.345 |
| 3 | 5 | 11.482 |
| 4 | 7 | 2.586 |
| 5 | 9 | −2.361 |

Aspheric data

| | 1st surface | 2nd surface | 3rd surface | 4th surface | 5th surface |
|---|---|---|---|---|---|
| k | 1.011E+00 | 0.000E+00 | 0.000E+00 | 0.000E+00 | 0.000E+00 |
| A4 | −5.775E−02 | 2.388E−02 | 3.002E−01 | −6.536E−03 | −3.004E−01 |
| A6 | 2.481E−02 | −8.027E−02 | −3.518E−01 | 1.149E−02 | 1.128E−01 |
| A8 | −1.504E−01 | 5.720E−02 | 3.153E−01 | 1.648E−02 | −3.398E−01 |
| A10 | 1.673E−01 | −6.533E−02 | 7.583E−02 | −1.860E−02 | 4.979E−01 |
| A12 | −1.622E−01 | 2.832E−02 | −4.523E−01 | 7.241E−02 | −2.572E−01 |
| A14 | 4.692E−02 | 3.545E−02 | 4.784E−01 | −4.913E−02 | 2.945E−02 |
| A16 | 6.525E−03 | −2.914E−02 | −1.833E−01 | −6.770E−03 | −2.653E−03 |

| | 6th surface | 7th surface | 8th surface | 9th surface | 10th surface |
|---|---|---|---|---|---|
| k | 0.000E+00 | 0.000E+00 | −6.298E−01 | 0.000E+00 | −8.767E+00 |
| A4 | −1.277E−02 | 2.645E−02 | 2.635E−01 | −5.716E−02 | −8.868E−02 |
| A6 | −2.647E−01 | 3.372E−03 | −1.899E−01 | 9.641E−03 | 4.785E−02 |
| A8 | 2.234E−01 | −3.200E−02 | 1.494E−01 | 1.923E−02 | −2.236E−02 |
| A10 | 2.360E−02 | 1.373E−01 | −3.424E−02 | −1.110E−02 | 7.197E−03 |
| A12 | −9.692E−02 | −1.820E−01 | 5.082E−04 | 2.512E−03 | −1.491E−03 |
| A14 | 3.891E−02 | 1.072E−01 | −2.247E−03 | −2.322E−04 | 1.763E−04 |
| A16 | −3.696E−03 | −2.646E−02 | 9.650E−04 | 2.152E−06 | −9.007E−06 |

The image pickup lens according to Embodiment 3 satisfies all conditional expressions (1) through (13), as shown in Table 11.

Figure 6:
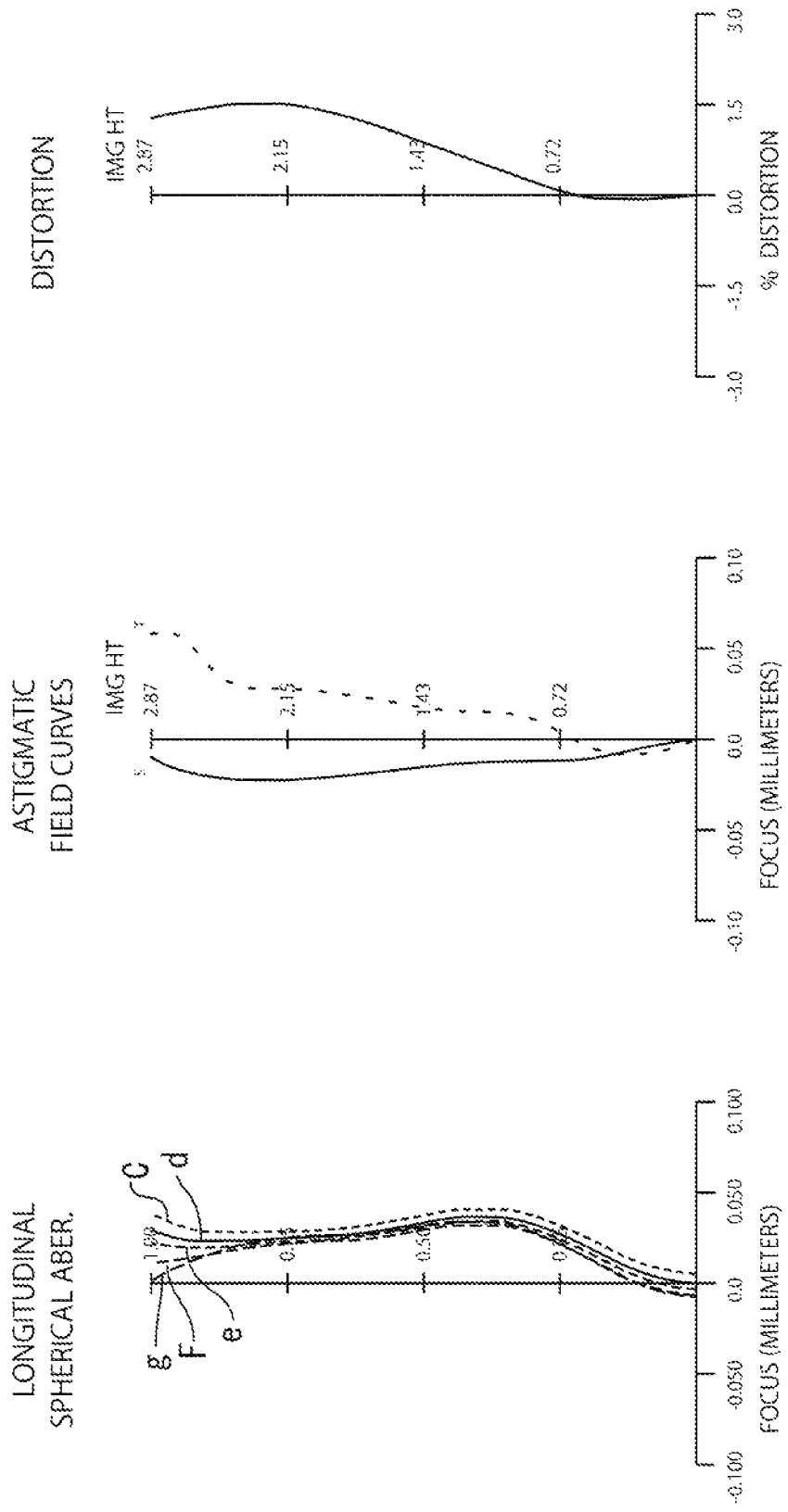
FIG. 6 is a view showing a spherical aberration, an astigmatism and a distortion of the image pickup lens according to Embodiment 3.
Figure 7:
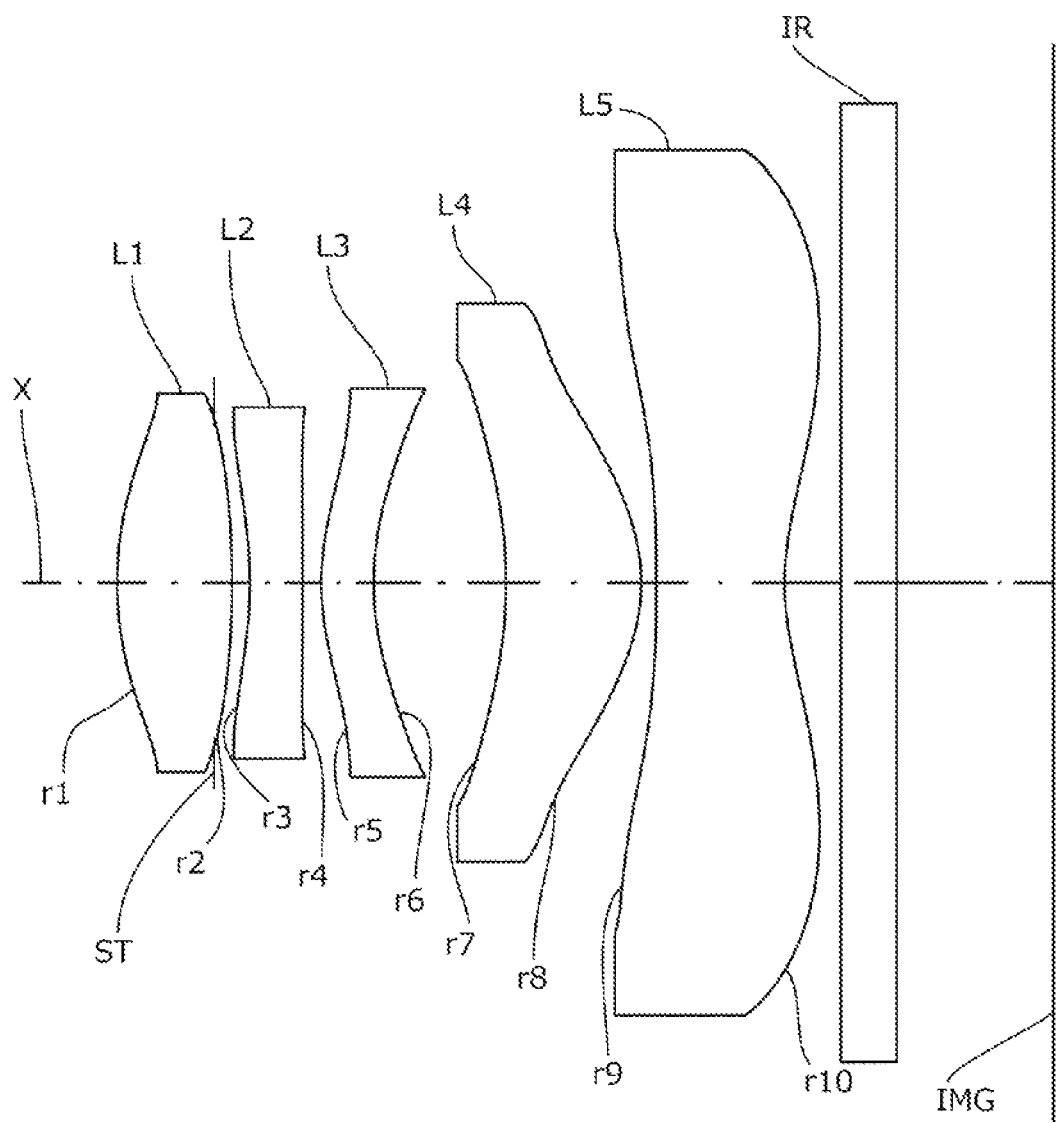
FIG. 7 is a view showing a general configuration of the image pickup lens according to Embodiment 4.

FIG. 6 shows a spherical aberration (mm), an astigmatism (mm), and a distortion (%) of the image pickup lens according to Embodiment 3. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 6, it can be seen that the respective aberrations are satisfactorily corrected.

Further, the total track length TTL is as short as 4.868 mm and a ratio thereof to the maximum image height IH (TTL/2IH) is 0.848, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 3, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Embodiment 4

Basic lens data will be shown in Table 4 below.

TABLE 4

Embodiment 4

Unit mm f = 4.109
Fno = 2.25
ω = 34.48
IH = 2.87

Surface data

| Surface No. i | Curvature radius r | Surface distance d | Refractive index Nd | Abbe number νd |
|---|---|---|---|---|
| (Object surface) | Infinity | Infinity | | |
| 1* | 1.808 | 0.615 | 1.5346 | 56.16 |
| 2* (Stop) | −4.609 | 0.095 | | |
| 3* | −2.076 | 0.280 | 1.6355 | 23.91 |
| 4* | −87.898 | 0.100 | | |
| 5* | 1.406 | 0.280 | 1.6142 | 25.58 |
| 6* | 1.609 | 0.708 | | |
| 7* | −2.478 | 0.722 | 1.5346 | 56.16 |
| 8* | −0.976 | 0.080 | | |
| 9* | −11.076 | 0.684 | 1.5094 | 55.87 |
| 10* | 1.384 | 0.3 | | |
| 11 | Infinity | 0.3 | 1.5168 | 64.17 |
| 12 | Infinity | 0.836 | | |
| Image Plane | Infinity | | | |

Single lens data

| Lens | Start plane | Focal length |
|---|---|---|
| 1 | 1 | 2.513 |
| 2 | 3 | −3.350 |
| 3 | 5 | 11.883 |
| 4 | 7 | 2.582 |
| 5 | 9 | −2.371 |

Aspheric data

| | 1st surface | 2nd surface | 3rd surface | 4th surface | 5th surface |
|---|---|---|---|---|---|
| k | 1.012E+00 | 0.000E+00 | 0.000E+00 | 0.000E+00 | 0.000E+00 |
| A4 | −5.780E−02 | 2.448E−02 | 3.002E−01 | −4.328E−03 | −3.046E−01 |
| A6 | 2.505E−02 | −8.029E−02 | −3.513E−01 | 1.188E−02 | 1.130E−01 |
| A8 | −1.502E−01 | 5.694E−02 | 3.154E−01 | 1.635E−02 | −3.387E−01 |
| A10 | 1.673E−01 | −6.573E−02 | 7.534E−02 | −1.876E−02 | 4.984E−01 |
| A12 | −1.624E−01 | 2.785E−02 | −4.532E−01 | 7.223E−02 | −2.574E−01 |
| A14 | 4.658E−02 | 3.498E−02 | 4.776E−01 | −4.961E−02 | 2.891E−02 |
| A16 | 5.975E−03 | −2.948E−02 | −1.833E−01 | −7.962E−03 | −3.298E−03 |

| | 6th surface | 7th surface | 8th surface | 9th surface | 10th surface |
|---|---|---|---|---|---|
| k | 0.000E+00 | 0.000E+00 | −6.298E−01 | 0.000E+00 | −8.780E+00 |
| A4 | −1.140E−02 | 2.716E−02 | 2.634E−01 | −5.718E−02 | −8.874E−02 |
| A6 | −2.656E−02 | 3.535E−03 | −1.899E−01 | 9.631E−03 | 4.786E−02 |
| A8 | 2.227E−01 | −3.212E−02 | 1.494E−01 | 1.923E−02 | −2.236E−02 |
| A10 | 2.344E−02 | 1.371E−01 | −3.422E−02 | −1.110E−02 | 7.197E−03 |
| A12 | −9.681E−02 | −1.822E−01 | 5.142E−04 | 2.512E−03 | −1.491E−03 |
| A14 | 3.905E−02 | 1.072E−01 | −2.245E−03 | −2.320E−04 | 1.763E−04 |
| A16 | −3.637E−03 | −2.633E−02 | 9.654E−04 | 2.206E−06 | −9.006E−06 |

The image pickup lens according to Embodiment 4 satisfies all conditional expressions (1) through (13), as shown in Table 11.

Figure 8:
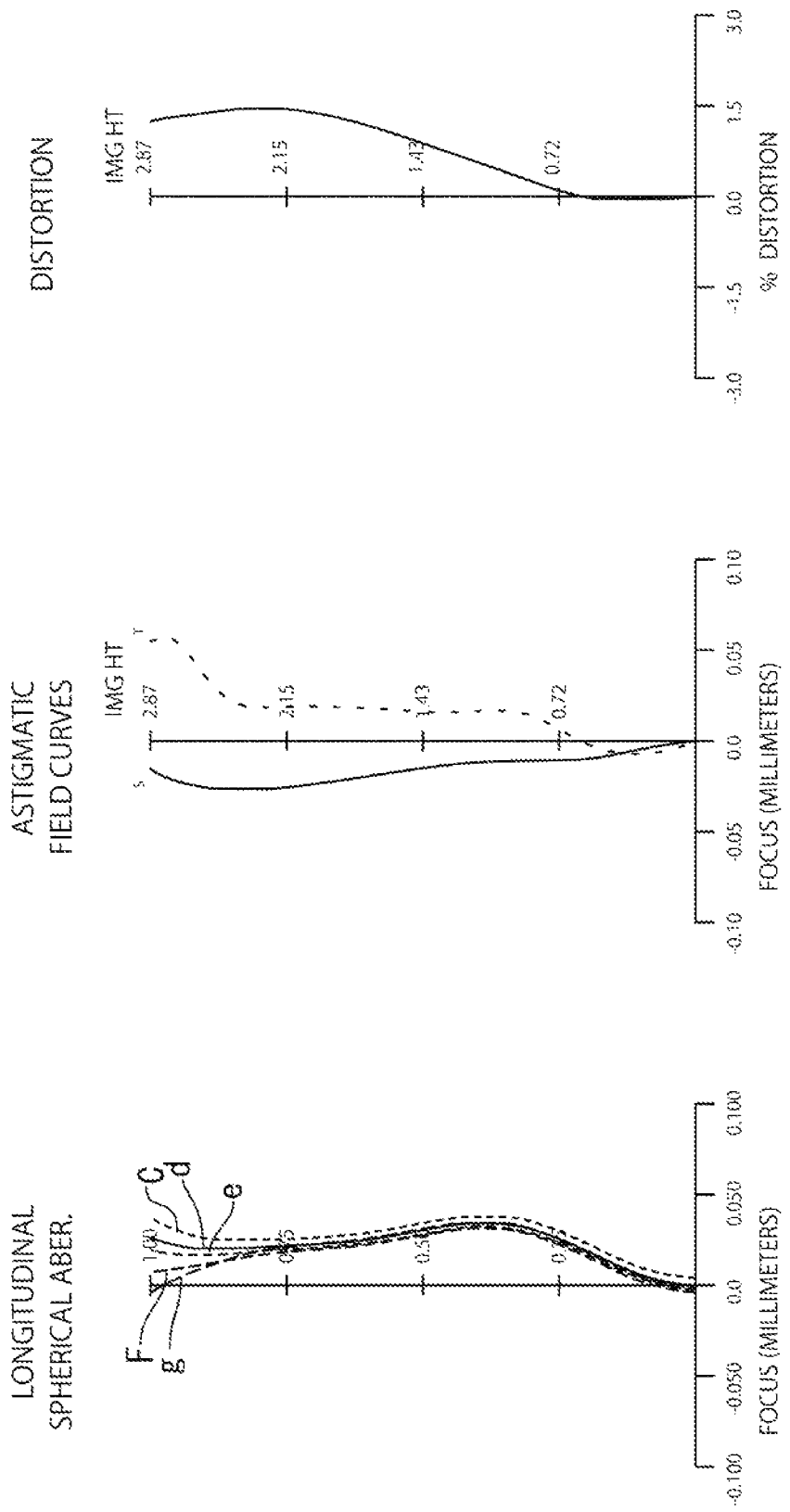
FIG. 8 is a view showing a spherical aberration, an astigmatism and a distortion of the image pickup lens according to Embodiment 4.
Figure 9:
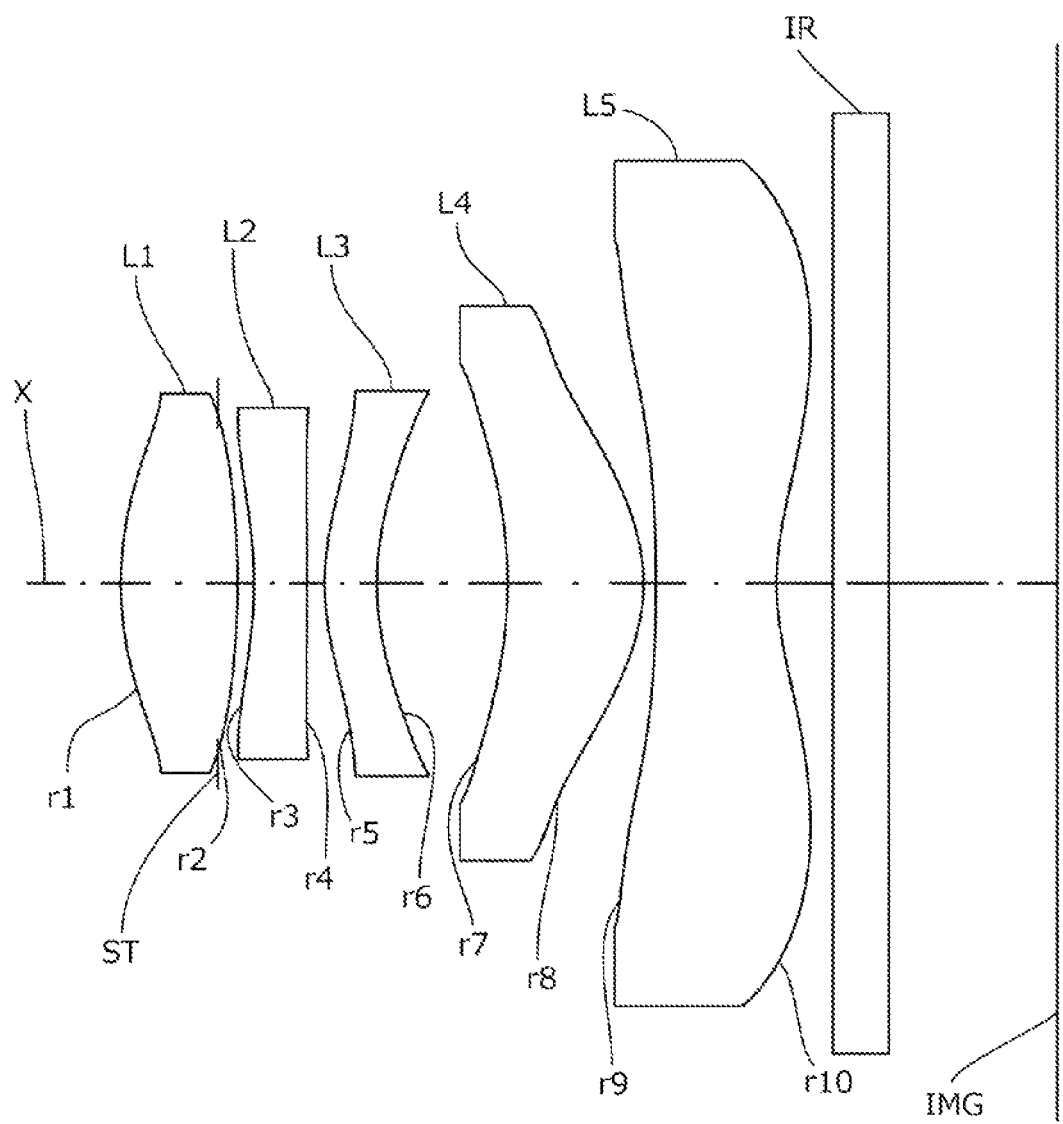
FIG. 9 is a diagram showing a general configuration of an image pickup lens according to Embodiment 5.
Figure 11:
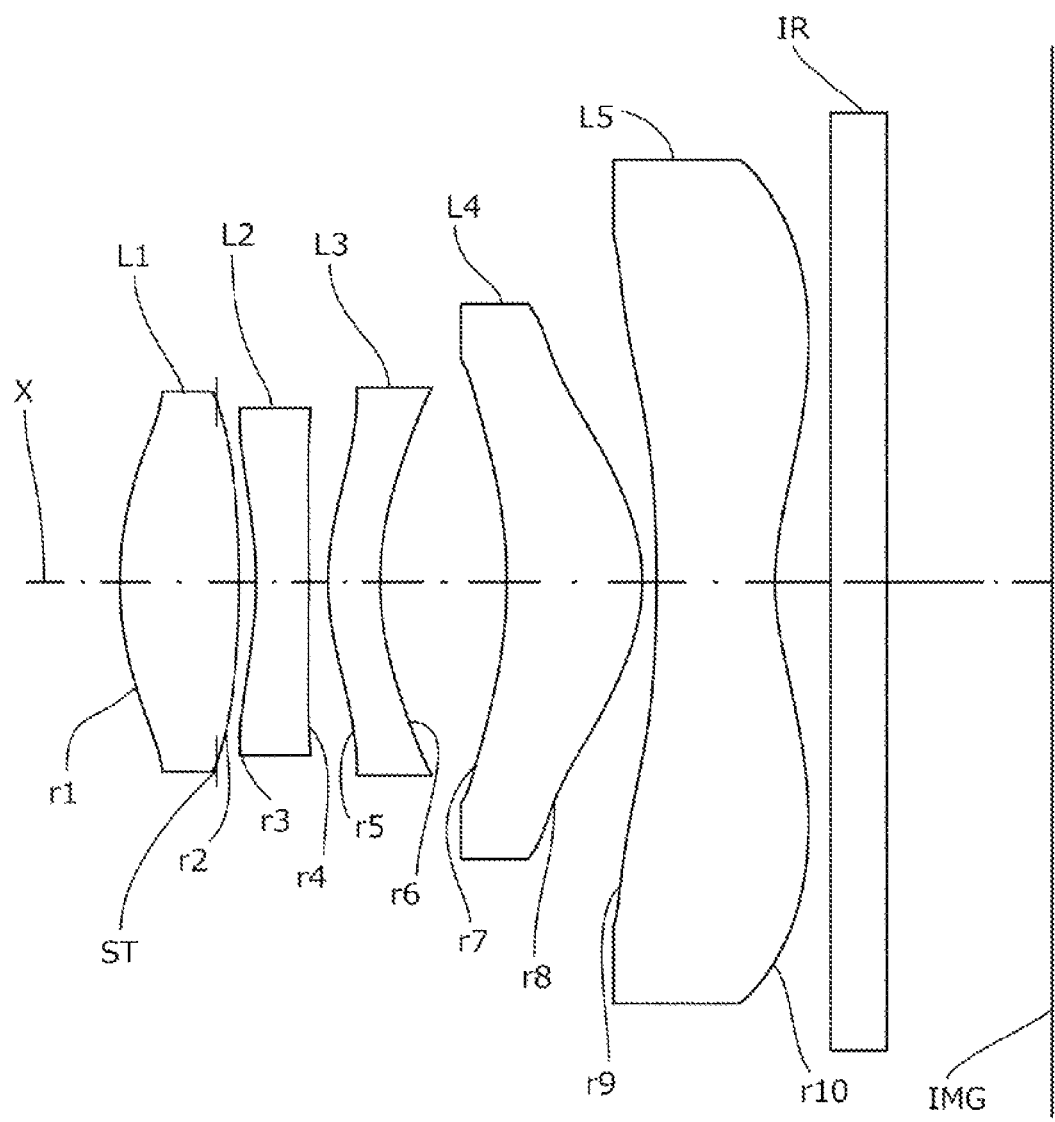
FIG. 11 is a view showing a general configuration of the image pickup lens according to Embodiment 6.

FIG. 8 shows a spherical aberration (mm), an astigmatism (mm), and a distortion (%) of the image pickup lens according to Embodiment 4. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 8, it can be seen that the respective aberrations are satisfactorily corrected.

Further, the total track length TTL is as short as 4.874 mm and a ratio thereof to the maximum image height IH (TTL/2IH) is 0.849, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 4, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Embodiment 5

Basic lens data will be shown in Table 5 below.

TABLE 5

Embodiment 5

Unit mm $f = 4.111$
$Fno = 2.25$
$\omega = 34.34$
$IH = 2.87$

Surface data

| Surface No. i | Curvature radius r | Surface distance d | Refractive index Nd | Abbe number vd |
|---|---|---|---|---|
| (Object surface) | Infinity | Infinity | | |
| 1* | 1.812 | 0.624 | 1.5346 | 56.16 |
| 2* (Stop) | −4.538 | 0.088 | | |
| 3* | −2.083 | 0.280 | 1.6355 | 23.91 |
| 4* | −320.118 | 0.096 | | |
| 5* | 1.393 | 0.280 | 1.6355 | 23.91 |
| 6* | 1.614 | 0.698 | | |
| 7* | −2.464 | 0.726 | 1.5346 | 56.16 |
| 8* | −0.976 | 0.065 | | |
| 9* | −11.549 | 0.646 | 1.5094 | 55.87 |
| 10* | 1.389 | 0.3 | | |
| 11 | Infinity | 0.3 | 1.5168 | 64.17 |
| 12 | Infinity | 0.858 | | |
| Image Plane | Infinity | | | |

Single lens data

| Lens | Start plane | Focal length |
|---|---|---|
| 1 | 1 | 2.508 |
| 2 | 3 | −3.300 |
| 3 | 5 | 10.717 |
| 4 | 7 | 2.583 |
| 5 | 9 | −2.394 |

Aspheric data

| | 1st surface | 2nd surface | 3rd surface | 4th surface | 5th surface |
|---|---|---|---|---|---|
| k | 1.018E+00 | 0.000E+00 | 0.000E+00 | 0.000E+00 | 0.000E+00 |
| A4 | −6.038E−02 | 2.219E−02 | 3.008E−01 | −8.640E−03 | −3.056E−01 |
| A6 | 2.494E−02 | −7.983E−02 | −3.511E−01 | 7.081E−03 | 1.194E−01 |
| A8 | −1.527E−01 | 5.781E−02 | 3.149E−01 | 1.515E−02 | −3.386E−01 |
| A10 | 1.676E−01 | −6.438E−02 | 7.352E−02 | −1.810E−02 | 4.971E−01 |
| A12 | −1.602E−01 | 2.955E−02 | −4.531E−01 | 7.286E−03 | −2.594E−01 |
| A14 | 4.644E−02 | 3.578E−02 | 4.787E−01 | −4.953E−02 | 2.912E−02 |
| A16 | 6.744E−03 | −3.084E−02 | −1.812E−01 | −5.871E−03 | −2.117E−03 |

| | 6th surface | 7th surface | 8th surface | 9th surface | 10th surface |
|---|---|---|---|---|---|
| k | 0.000E+00 | 0.000E+00 | −6.298E−01 | 0.000E+00 | −9.238E+00 |
| A4 | −8.524E−03 | 2.074E−02 | 2.653E−01 | −5.732E−02 | −8.861E−02 |
| A6 | −2.634E−01 | 4.216E−03 | −1.895E−01 | 9.599E−03 | 4.786E−02 |
| A8 | 2.261E−01 | −3.103E−02 | 1.494E−01 | 1.921E−02 | −2.237E−02 |
| A10 | 2.489E−02 | 1.380E−01 | −3.430E−02 | −1.112E−02 | 7.196E−03 |
| A12 | −9.557E−02 | −1.817E−01 | 5.378E−04 | 2.508E−03 | −1.491E−03 |

TABLE 5-continued

Embodiment 5

| | | | | | |
|---|---|---|---|---|---|
| A14 | 3.880E−02 | 1.071E−01 | −2.241E−03 | −2.327E−04 | 1.762E−04 |
| A16 | −5.605E−03 | −2.654E−02 | 9.631E−04 | 2.567E−06 | −9.029E−06 |

The image pickup lens according to Embodiment 5 satisfies all conditional expressions (1) through (13), as shown in Table 11.

FIG. 10 shows a spherical aberration (mm), an astigmatism (mm), and a distortion (%) of the image pickup lens according to Embodiment 5. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 10, it can be seen that the respective aberrations are satisfactorily corrected.

Further, the total track length TTL is as short as 4.858 mm and a ratio thereof to the maximum image height IH (TTL/2IH) is 0.846, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 5, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Embodiment 6

Basic lens data will be shown in Table 6 below.

TABLE 6

Embodiment 6

Unit mm f = 4.120
Fno = 2.25
ω = 34.41
IH = 2.87

Surface data

| Surface No. i | Curvature radius r | Surface distance d | Refractive index Nd | Abbe number νd |
|---|---|---|---|---|
| (Object surface) | Infinity | Infinity | | |
| 1* | 1.794 | 0.641 | 1.5346 | 56.16 |
| 2* (Stop) | −4.803 | 0.090 | | |
| 3* | −2.072 | 0.280 | 1.6355 | 23.91 |
| 4* | −76.565 | 0.103 | | |
| 5* | 1.387 | 0.280 | 1.6142 | 25.58 |
| 6* | 1.596 | 0.680 | | |
| 7* | −2.529 | 0.727 | 1.5346 | 56.16 |
| 8* | −0.976 | 0.075 | | |
| 9* | −10.524 | 0.683 | 1.5094 | 55.87 |
| 10* | 1.400 | 0.3 | | |
| 11 | Infinity | 0.3 | 1.5168 | 64.17 |
| 12 | Infinity | 0.884 | | |
| Image Plane | Infinity | | | |

Single lens data

| Lens | Start plane | Focal length |
|---|---|---|
| 1 | 1 | 2.529 |
| 2 | 3 | −3.356 |
| 3 | 5 | 11.416 |
| 4 | 7 | 2.558 |
| 5 | 9 | −2.382 |

Aspheric data

| | 1st surface | 2nd surface | 3rd surface | 4th surface | 5th surface |
|---|---|---|---|---|---|
| k | 1.035E+00 | 0.000E+00 | 0.000E+00 | 0.000E+00 | 0.000E+00 |
| A4 | −5.734E−02 | 2.331E−02 | 2.990E−01 | 5.217E−04 | −3.064E−01 |
| A6 | 2.599E−02 | −8.114E−02 | −3.513E−01 | 9.403E−03 | 1.152E−01 |
| A8 | −1.488E−01 | 5.827E−02 | 3.133E−01 | 1.605E−02 | −3.439E−01 |
| A10 | 1.693E−01 | −6.421E−02 | 7.390E−02 | −1.880E−02 | 4.958E−01 |
| A12 | −1.614E−01 | 2.838E−02 | −4.534E−01 | 7.295E−02 | −2.561E−01 |

TABLE 6-continued

Embodiment 6

| | | | | | |
|---|---|---|---|---|---|
| A14 | 4.623E−02 | 3.460E−02 | 4.788E−01 | −4.798E−02 | 2.966E−02 |
| A16 | 4.596E−03 | −2.931E−02 | −1.807E−01 | −7.712E−03 | −3.283E−03 |

| | 6th surface | 7th surface | 8th surface | 9th surface | 10th surface |
|---|---|---|---|---|---|
| k | 0.000E+00 | 0.000E+00 | −6.275E−01 | 0.000E+00 | −9.409E+00 |
| A4 | −1.064E−02 | 2.461E−02 | 2.660E−01 | −5.734E−02 | −8.851E−02 |
| A6 | −2.674E−01 | 6.080E−03 | −1.901E−01 | 9.616E−03 | 4.783E−02 |
| A8 | 2.234E−01 | −3.166E−02 | 1.494E−01 | 1.922E−02 | −2.236E−02 |
| A10 | 2.366E−02 | 1.375E−01 | −3.416E−02 | −1.111E−02 | 7.197E−03 |
| A12 | −9.690E−02 | −1.821E−01 | 5.489E−04 | 2.511E−03 | −1.491E−03 |
| A14 | 3.877E−02 | 1.069E−01 | −2.231E−03 | −2.324E−04 | 1.762E−04 |
| A16 | −4.110E−03 | −2.605E−02 | 9.575E−04 | 2.317E−06 | −9.024E−06 |

The image pickup lens according to Embodiment 6 satisfies all conditional expressions (1) through (13), as shown in Table 11.

Figure 12:
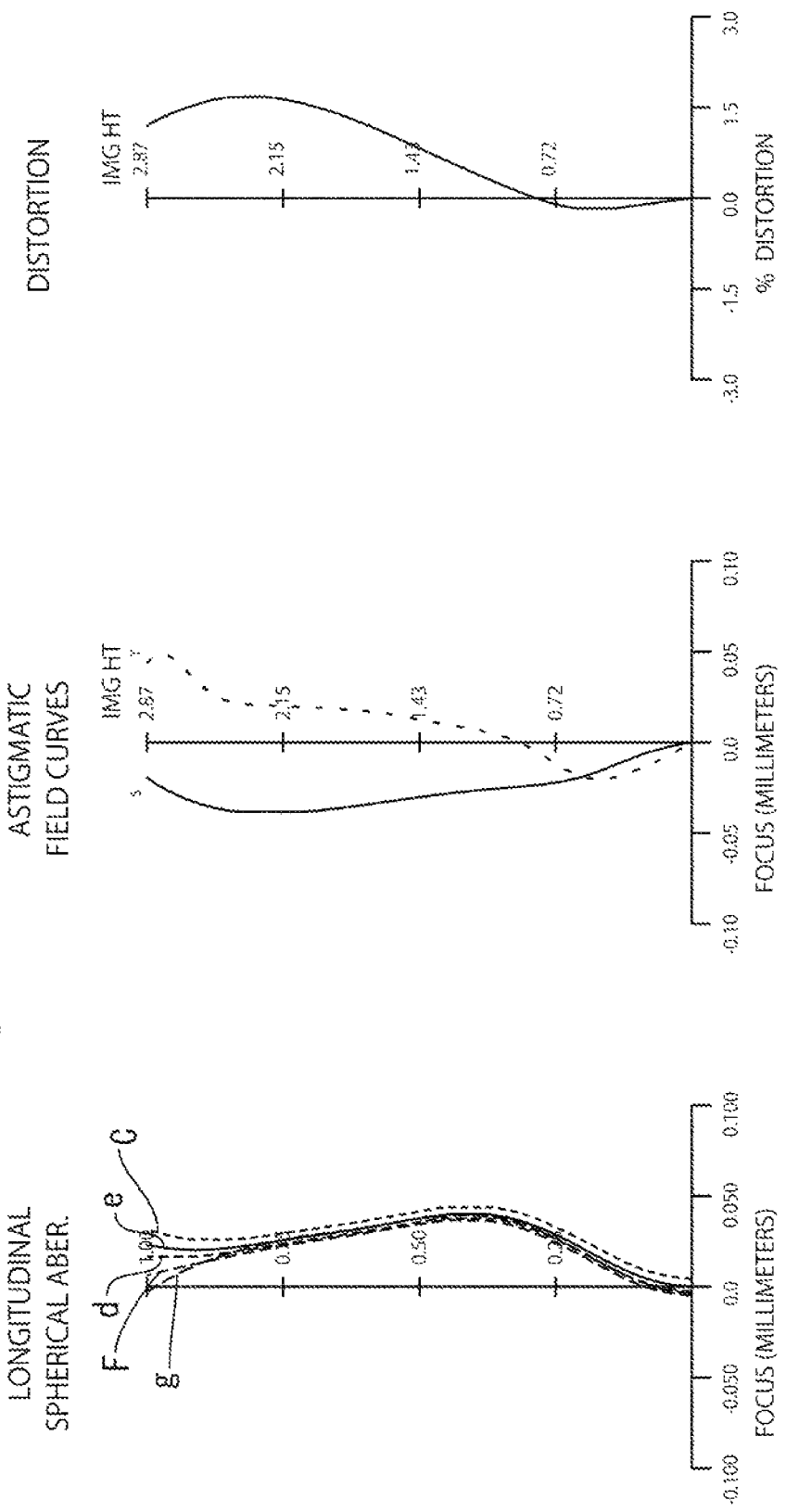
FIG. 12 is a view showing a spherical aberration, an astigmatism and a distortion of the image pickup lens according to Embodiment 6.
Figure 13:
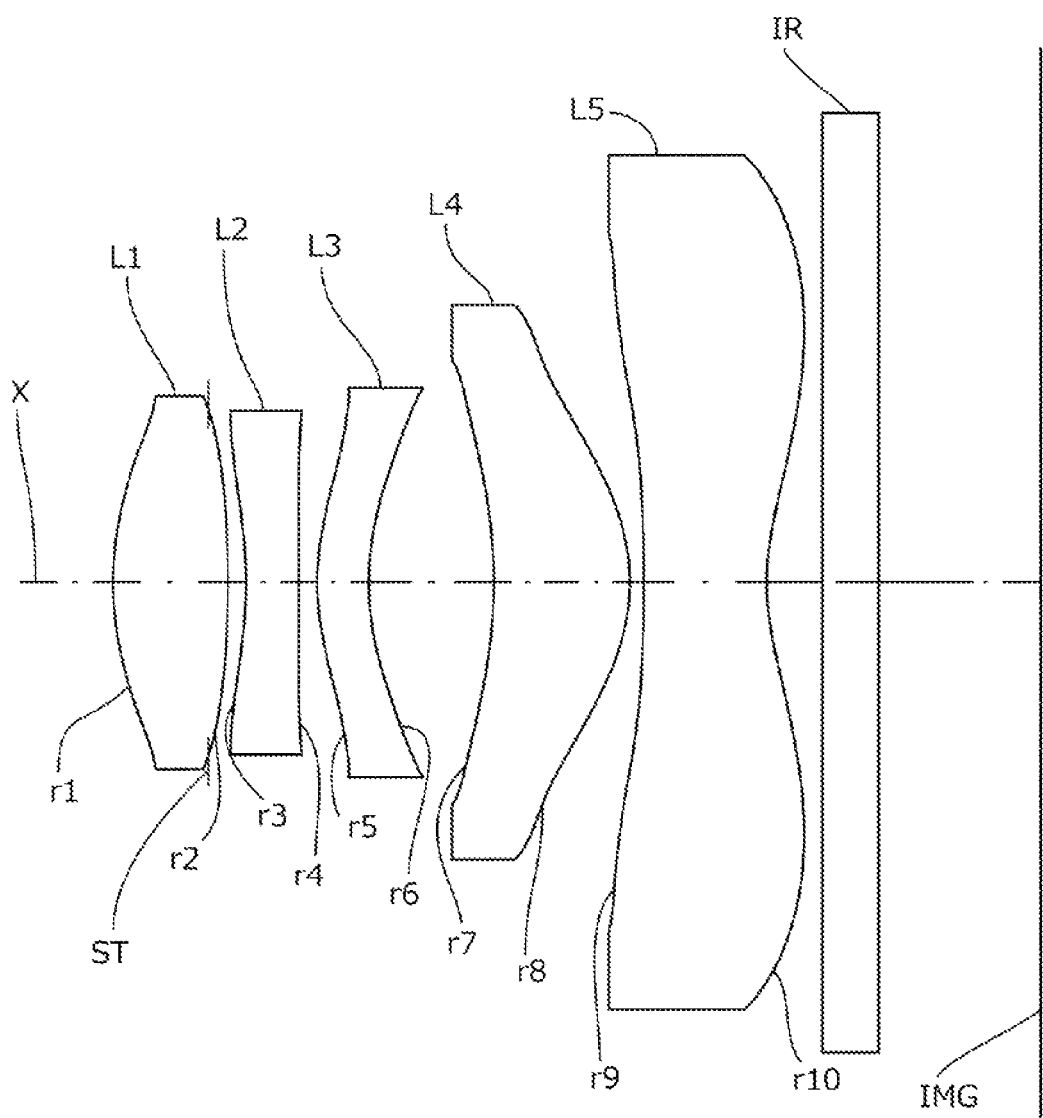
FIG. 13 is a view showing a general configuration of the image pickup lens according to Embodiment 7.

FIG. 12 shows a spherical aberration (mm), an astigmatism (mm), and a distortion (%) of the image pickup lens according to Embodiment 6. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 12, it can be seen that the respective aberrations are satisfactorily corrected.

Further, the total track length TTL is as short as 4.872 mm and a ratio thereof to the maximum image height IH (TTL/2IH) is 0.849, so that thinning is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 6, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Embodiment 7

Basic lens data will be shown in Table 7 below.

TABLE 7

Embodiment 7

Unit mm f = 4.027
Fno = 2.25
ω = 35.05
IH = 2.87

Surface data

| Surface No. i | Curvature radius r | Surface distance d | Refractive index Nd | Abbe number νd |
|---|---|---|---|---|
| (Object surface) | Infinity | Infinity | | |
| 1* | 1.754 | 0.620 | 1.5094 | 55.87 |
| 2* (Stop) | −4.905 | 0.098 | | |
| 3* | −2.135 | 0.280 | 1.6355 | 23.91 |
| 4* | −317.746 | 0.098 | | |
| 5* | 1.348 | 0.280 | 1.6355 | 23.91 |
| 6* | 1.552 | 0.672 | | |
| 7* | −2.710 | 0.734 | 1.5346 | 56.16 |
| 8* | −0.983 | 0.072 | | |
| 9* | −14.519 | 0.662 | 1.5094 | 55.87 |
| 10* | 1.357 | 0.3 | | |
| 11 | Infinity | 0.3 | 1.5168 | 64.17 |
| 12 | Infinity | 0.870 | | |
| Image Plane | Infinity | | | |

Single lens data

| Lens | Start plane | Focal length |
|---|---|---|
| 1 | 1 | 2.618 |
| 2 | 3 | −3.384 |
| 3 | 5 | 10.540 |
| 4 | 7 | 2.510 |
| 5 | 9 | −2.403 |

TABLE 7-continued

Embodiment 7

Aspheric data

|  | 1st surface | 2nd surface | 3rd surface | 4th surface | 5th surface |
|---|---|---|---|---|---|
| k | 1.009E+00 | 0.000E+00 | 0.000E+00 | 0.000E+00 | 0.000E+00 |
| A4 | −5.811E−02 | 2.422E−02 | 2.991E−01 | 1.361E−03 | −3.053E−01 |
| A6 | 2.325E−02 | −7.971E−02 | −3.516E−01 | 1.146E−02 | 1.154E−01 |
| A8 | −1.500E−01 | 5.860E−02 | 3.136E−01 | 1.814E−02 | −3.447E−01 |
| A10 | 1.695E−01 | −6.507E−02 | 7.415E−02 | −1.785E−02 | 4.950E−01 |
| A12 | −1.609E−01 | 2.683E−02 | −4.539E−01 | 7.247E−02 | −2.564E−01 |
| A14 | 4.598E−02 | 3.317E−02 | 4.771E−02 | −4.960E−02 | 2.948E−02 |
| A16 | 2.857E−03 | −2.947E−02 | −1.827E−01 | −9.621E−03 | −3.599E−03 |
|  | 6th surface | 7th surface | 8th surface | 9th surface | 10th surface |
| k | 0.000E+00 | 0.000E+00 | −6.262E−01 | 0.000E+00 | −8.393E+00 |
| A4 | −1.388E−02 | 2.672E−02 | 2.652E−01 | −5.757E−02 | −8.762E−02 |
| A6 | −2.703E−01 | 7.487E−03 | −1.904E−01 | 9.569E−03 | 4.787E−02 |
| A8 | 2.229E−01 | −3.182E−02 | 1.494E−01 | 1.921E−02 | −2.236E−02 |
| A10 | 2.370E−02 | 1.367E−01 | −3.415E−02 | −1.111E−02 | 7.198E−03 |
| A12 | −9.698E−02 | −1.825E−01 | 5.199E−04 | 2.512E−03 | −1.491E−03 |
| A14 | 3.836E−02 | 1.070E−01 | −2.268E−03 | −2.319E−04 | 1.763E−04 |
| A16 | −4.698E−03 | −2.583E−02 | 9.359E−04 | 2.393E−06 | −9.003E−06 |

The image pickup lens according to Embodiment 7 satisfies all conditional expressions (1) through (13), as shown in Table 11.

Figure 14:
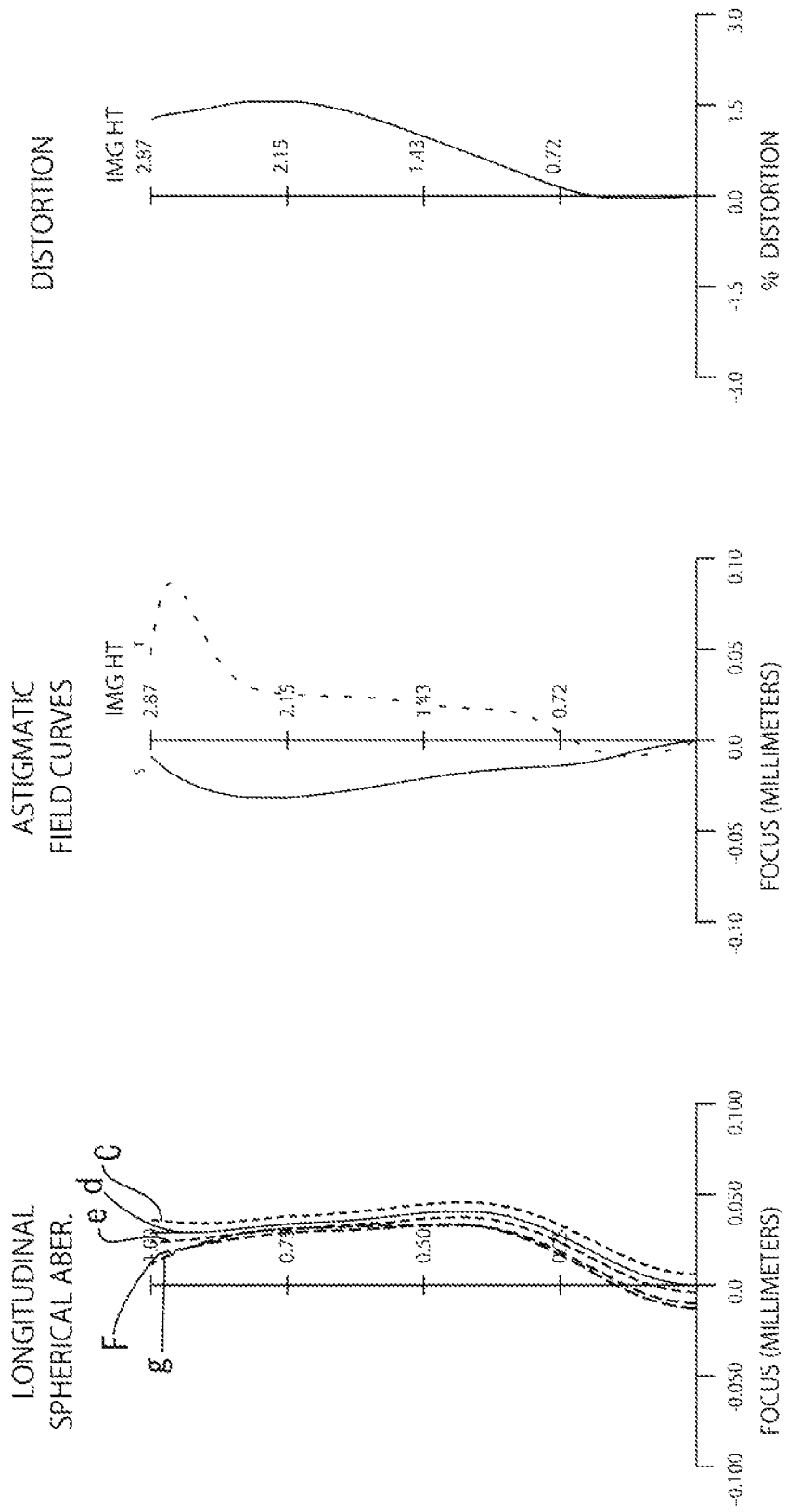
FIG. 14 is a view showing a spherical aberration, an astigmatism and a distortion of the image pickup lens according to Embodiment 7.
Figure 15:
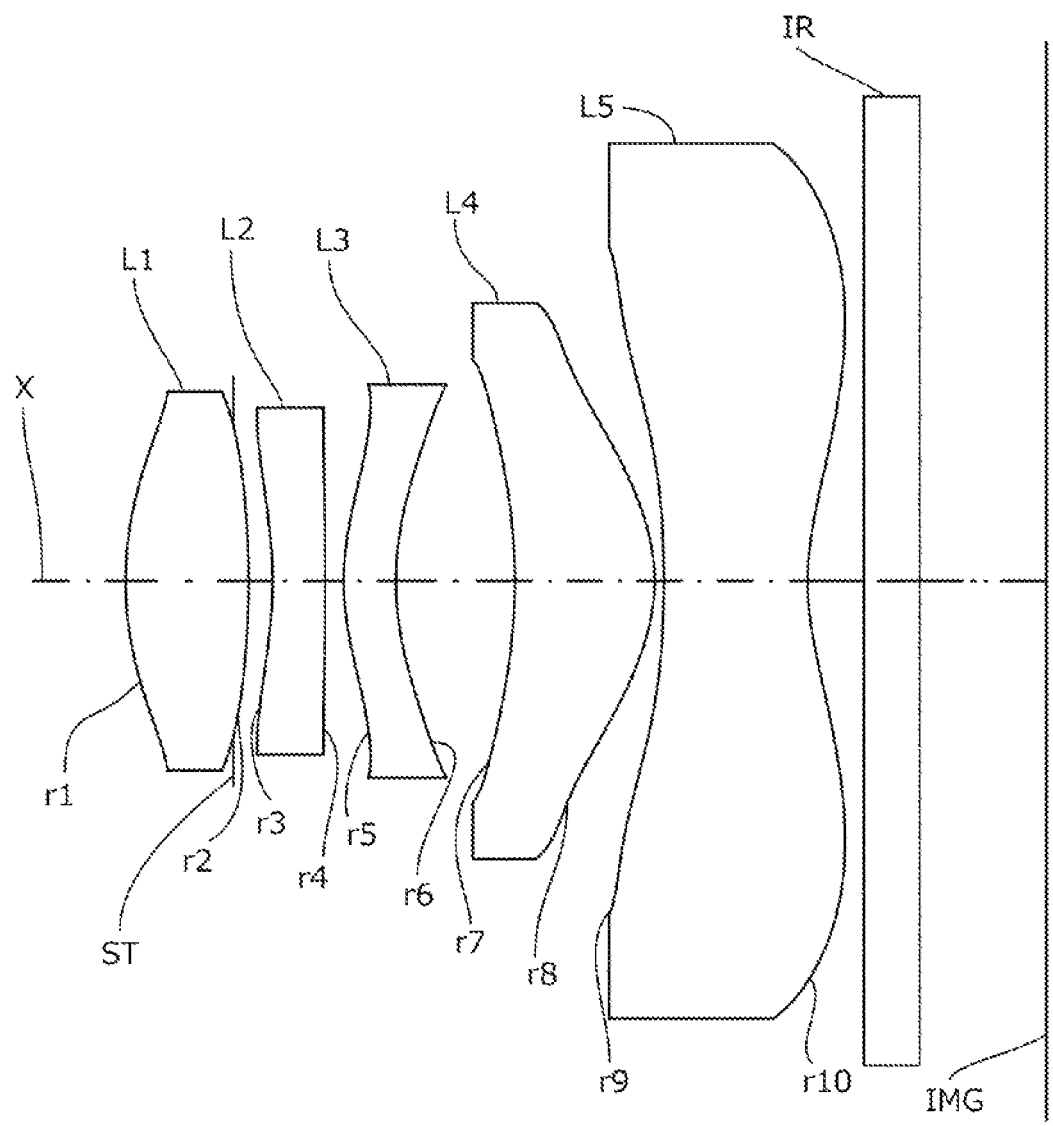
FIG. 15 is a view showing a general configuration of the image pickup lens according to Embodiment 8.

FIG. 14 shows a spherical aberration (mm), an astigmatism (mm), and a distortion (%) of the image pickup lens according to Embodiment 7. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 14, it can be seen that the respective aberrations are satisfactorily corrected.

Further, the total track length TTL is as short as 4.850 mm and a ratio thereof to the maximum image height IH (TTL/2IH) is 0.845, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 7, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Embodiment 8

Basic lens data will be shown in Table 8 below.

TABLE 8

Embodiment 8

Unit mm f = 3.973
Fno = 2.25
ω = 35.36
IH = 2.87

Surface data

| Surface No. i | Curvature radius r | Surface distance d | Refractive index Nd | Abbe number νd |
|---|---|---|---|---|
| (Object surface) | Infinity | Infinity |  |  |
| 1* | 1.798 | 0.658 | 1.4970 | 81.61 |
| 2* (Stop) | −4.847 | 0.128 |  |  |
| 3* | −2.136 | 0.280 | 1.5837 | 30.13 |
| 4* | −33.794 | 0.099 |  |  |
| 5* | 1.417 | 0.280 | 1.6142 | 25.58 |
| 6* | 1.660 | 0.635 |  |  |
| 7* | −3.018 | 0.746 | 1.5346 | 56.16 |
| 8* | −0.988 | 0.050 |  |  |
| 9* | −5.267 | 0.767 | 1.5094 | 55.87 |
| 10* | 1.399 | 0.3 |  |  |
| 11 | Infinity | 0.3 | 1.5168 | 64.17 |
| 12 | Infinity | 0.675 |  |  |
| Image Plane | Infinity |  |  |  |

TABLE 8-continued

Embodiment 8

Single lens data

| Lens | Start plane | Focal length |
|---|---|---|
| 1 | 1 | 2.728 |
| 2 | 3 | −3.918 |
| 3 | 5 | 10.948 |
| 4 | 7 | 2.432 |
| 5 | 9 | −2.089 |

Aspheric data

|  | 1st surface | 2nd surface | 3rd surface | 4th surface | 5th surface |
|---|---|---|---|---|---|
| k | 9.857E−01 | 0.000E+00 | 0.000E+00 | 0.000E+00 | 0.000E+00 |
| A4 | −5.883E−02 | 1.656E−02 | 2.983E−01 | −1.421E−02 | −3.046E−01 |
| A6 | 1.993E−02 | −7.838E−02 | −3.529E−01 | 7.156E−03 | 1.167E−01 |
| A8 | −1.502E−01 | 6.235E−02 | 3.171E−01 | 2.153E−02 | −3.441E−01 |
| A10 | 1.740E−01 | −6.231E−02 | 7.763E−02 | −1.701E−02 | 4.981E−01 |
| A12 | −1.545E−01 | 2.767E−02 | −4.565E−01 | 6.676E−03 | −2.527E−01 |
| A14 | 4.972E−02 | 3.235E−02 | 4.687E−01 | −5.767E−02 | 2.941E−02 |
| A16 | −1.251E−04 | −3.164E−02 | −1.822E−01 | −7.793E−03 | −1.389E−02 |

|  | 6th surface | 7th surface | 8th surface | 9th surface | 10th surface |
|---|---|---|---|---|---|
| k | 0.000E+00 | 0.000E+00 | −6.215E−01 | 0.000E+00 | −8.866E+00 |
| A4 | −1.023E−02 | 2.546E−02 | 2.660E−01 | −5.100E−02 | −8.188E−02 |
| A6 | −2.648E−01 | −6.695E−03 | −1.911E−01 | 1.173E−02 | 4.682E−02 |
| A8 | 2.240E−01 | −3.315E−02 | 1.490E−01 | 1.946E−02 | −2.244E−02 |
| A10 | 2.438E−02 | 1.393E−01 | −3.423E−02 | −1.116E−02 | 7.206E−03 |
| A12 | −9.649E−02 | −1.815E−01 | 5.954E−04 | 2.483E−03 | −1.490E−03 |
| A14 | 3.818E−02 | 1.067E−01 | −2.257E−03 | −2.395E−04 | 1.764E−04 |
| A16 | −5.407E−03 | −2.663E−02 | 9.100E−04 | 1.364E−06 | −8.989E−06 |

The image pickup lens according to Embodiment 8 satisfies all conditional expressions (1) through (13), as shown in Table 11.

Figure 16:
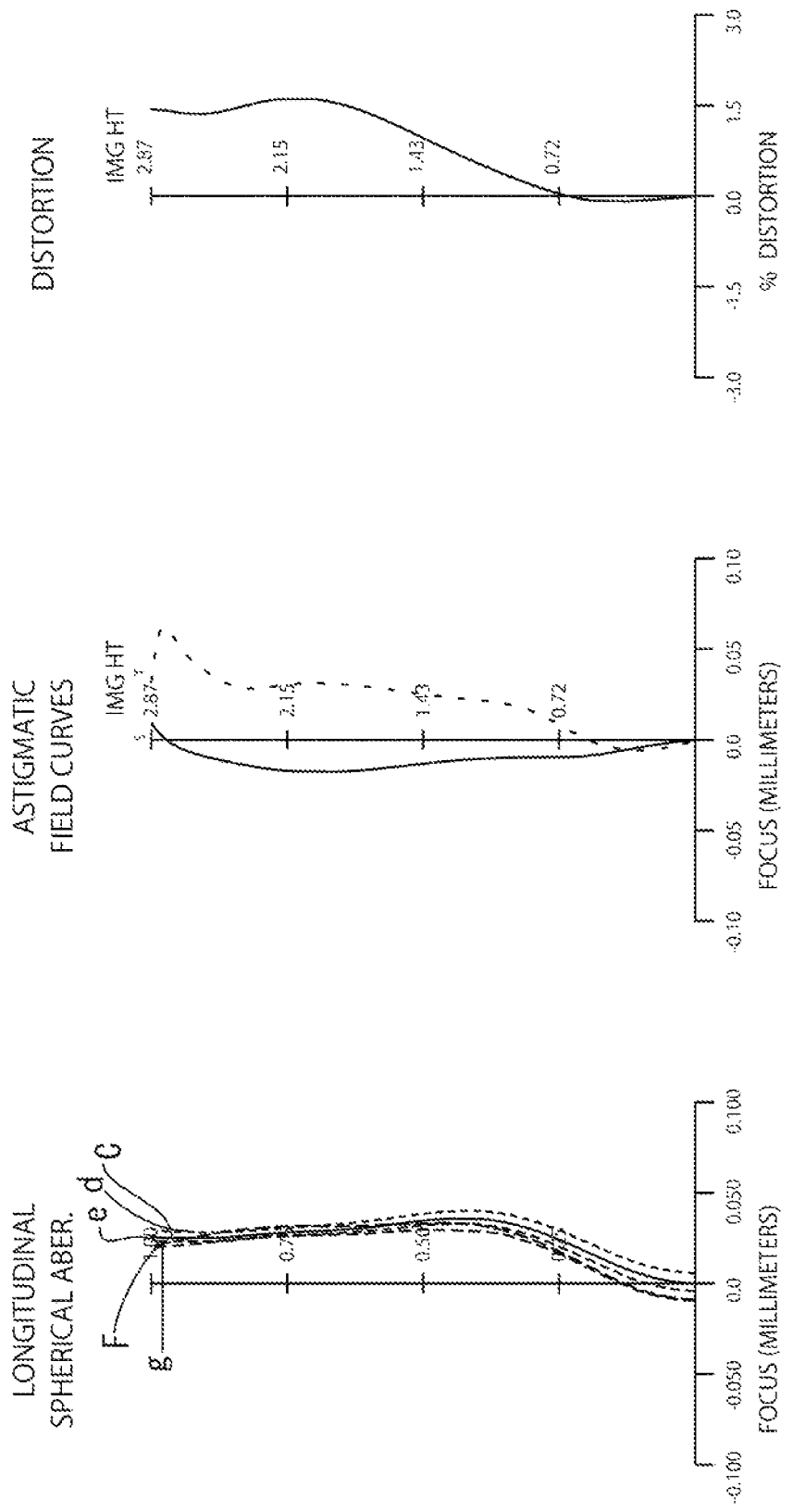
FIG. 16 is a view showing a spherical aberration, an astigmatism and a distortion of the image pickup lens according to Embodiment 8.
Figure 17:
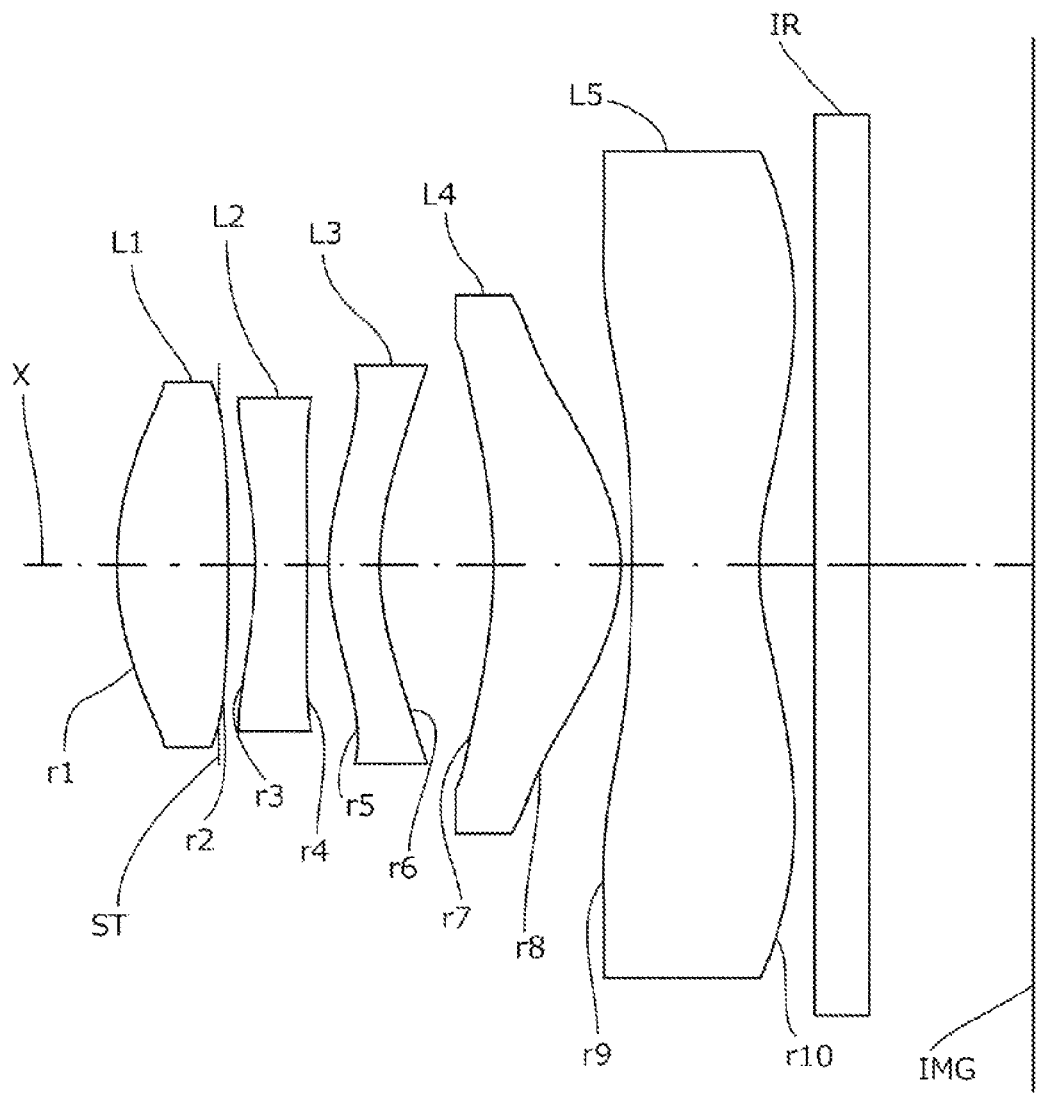
FIG. 17 is a view showing a general configuration of the image pickup lens according to Embodiment 9.

FIG. 16 shows a spherical aberration (mm), an astigmatism (mm), and a distortion (%) of the image pickup lens according to Embodiment 8. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 16, it can be seen that the respective aberrations are satisfactorily corrected.

Further, the total track length TTL is as short as 4.788 mm and a ratio thereof to the maximum image height IH (TTL/2IH) is 0.834, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 8, the first lens L1 adopts a glass material, the second lens L2 and the third lens L3 adopt a polycarbonate-based plastic material, and the fourth lens L4 and the fifth lens L5 adopt a cycloolefin-based plastic material. Cost reduction is enabled by using much plastic materials.

Embodiment 9

Basic lens data will be shown in Table 9 below.

TABLE 9

Embodiment 9

Unit mm f = 3.998
Fno = 2.25
ω = 35.19
IH = 2.87

Surface data

| Surface No. i | Curvature radius r | Surface distance d | Refractive index Nd | Abbe number νd |
|---|---|---|---|---|
| (Object surface) | Infinity | Infinity |  |  |
| 1* | 1.696 | 0.611 | 1.5253 | 55.95 |
| 2* (Stop) | −11.391 | 0.146 |  |  |
| 3* | −2.046 | 0.280 | 1.6320 | 23.40 |
| 4* | −23.588 | 0.118 |  |  |
| 5* | 1.302 | 0.280 | 1.5850 | 29.90 |

TABLE 9-continued

Embodiment 9

| | | | | |
|---|---|---|---|---|
| 6* | 1.615 | 0.622 | | |
| 7* | −2.809 | 0.692 | 1.5253 | 55.95 |
| 8* | −0.985 | 0.060 | | |
| 9* | −14.057 | 0.697 | 1.5253 | 55.95 |
| 10* | 1.455 | 0.3 | | |
| 11 | Infinity | 0.3 | 1.5168 | 64.17 |
| 12 | Infinity | 0.891 | | |
| Image Plane | Infinity | | | |

Single lens data

| Lens | Start plane | Focal length |
|---|---|---|
| 1 | 1 | 2.857 |
| 2 | 3 | −3.562 |
| 3 | 5 | 8.646 |
| 4 | 7 | 2.553 |
| 5 | 9 | −2.472 |

Aspheric data

| | 1st surface | 2nd surface | 3rd surface | 4th surface | 5th surface |
|---|---|---|---|---|---|
| k | 1.076E+00 | 0.000E+00 | 0.000E+00 | 0.000E+00 | 0.000E+00 |
| A4 | −5.432E−02 | 3.254E−03 | 2.967E−01 | 3.153E−02 | −3.290E−01 |
| A6 | 2.361E−02 | −8.393E−02 | −3.488E−01 | 1.439E−02 | 1.163E−01 |
| A8 | −1.499E−01 | 6.447E−02 | 3.102E−01 | 2.335E−02 | −3.603E−01 |
| A10 | 1.720E−01 | −6.350E−02 | 6.903E−02 | −2.057E−02 | 4.883E−01 |
| A12 | −1.551E−01 | 2.486E−02 | −4.549E−01 | 6.695E−02 | −2.558E−01 |
| A14 | 4.539E−02 | 2.737E−02 | 4.807E−01 | −4.919E−02 | 3.214E−02 |
| A16 | −6.659E−03 | −2.716E−02 | −1.824E−01 | −7.186E−03 | −1.353E−03 |

| | 6th surface | 7th surface | 8th surface | 9th surface | 10th surface |
|---|---|---|---|---|---|
| k | 0.000E+00 | 0.000E+00 | −6.285E−01 | 0.000E+00 | −8.945E+00 |
| A4 | −1.873E−02 | 3.347E−02 | 2.600E−01 | −5.737E−02 | −8.546E−01 |
| A6 | −2.773E−01 | 5.347E−03 | −1.904E−01 | 9.633E−03 | 4.794E−02 |
| A8 | 2.171E−01 | −3.285E−02 | 1.498E−01 | 1.925E−02 | −2.235E−02 |
| A10 | 2.021E−02 | 1.371E−01 | −3.397E−02 | −1.110E−02 | 7.199E−03 |
| A12 | −9.593E−02 | −1.816E−01 | 5.770E−04 | 2.512E−03 | −1.491E−03 |
| A14 | 4.049E−02 | 1.076E−01 | −2.267E−03 | −2.316E−04 | 1.765E−04 |
| A16 | −4.437E−03 | −2.592E−02 | 9.082E−04 | 3.474E−06 | −8.949E−06 |

The image pickup lens according to Embodiment 9 satisfies all conditional expressions (1) through (13), as shown in Table 11.

Figure 18:
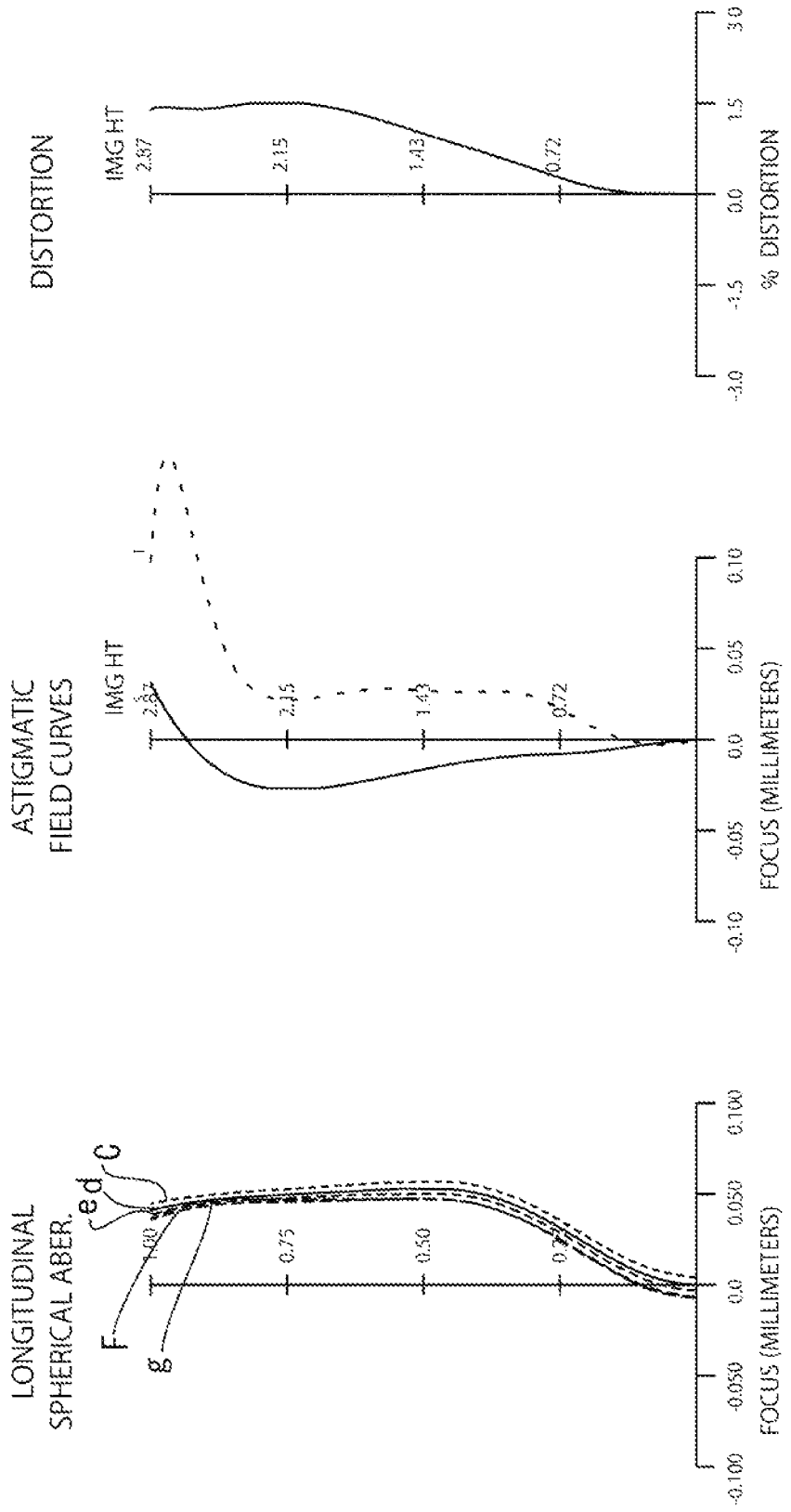
FIG. 18 is a view showing a spherical aberration, an astigmatism and a distortion of the image pickup lens according to Embodiment 9.

FIG. 18 shows a spherical aberration (mm), an astigmatism (mm), and a distortion (%) of the image pickup lens according to Embodiment 9. The spherical aberration diagram illustrates the amount of aberration with respect to the respective wavelengths of g-ray (436 nm), F-ray (486 nm), e-ray (546 nm), d-ray (588 nm) and C-ray (656 nm). Further, the astigmatism diagram illustrates the respective amounts of aberration on a sagittal image surface S and a tangential image surface T. As shown in FIG. 18, it can be seen that the respective aberrations are satisfactorily corrected.

Further, the total track length TTL is as short as 4.844 mm and a ratio thereof to the maximum image height IH (TTL/2IH) is 0.844, so that downsizing is realized even in a five-lens configuration. Moreover, the F-number is as bright as 2.25, and the half angle of field of the lens is approximately 35°, which means that a relatively wide angle of field is achieved.

Regarding the materials of the respective lenses according to Embodiment 9, the first lens L1 adopts a cycloolefin-based plastic material, the second lens L2 and the third lens L3 adopt a polycarbonate-based plastic material, and the fourth lens L4 and the fifth lens L5 adopt a cycloolefin-based plastic material. Cost reduction is enabled by forming all lenses using plastic materials.

Table 10 shows the values of respective parameters according to Embodiments 1 through 9.

TABLE 10

| Values of respective parameters | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| v1 | 56.16 | 56.16 | 56.16 | 56.16 | 56.16 | 56.16 | 55.87 | 81.61 | 55.95 |
| v2 | 23.91 | 23.91 | 23.91 | 23.91 | 23.91 | 23.91 | 23.91 | 30.13 | 23.40 |
| v3 | 23.91 | 23.91 | 23.91 | 25.58 | 23.91 | 25.58 | 23.91 | 25.58 | 29.90 |
| v4 | 56.16 | 56.16 | 56.16 | 56.16 | 56.16 | 56.16 | 56.16 | 56.16 | 55.95 |
| Nd2 | 1.6355 | 1.6355 | 1.6355 | 1.6355 | 1.6355 | 1.6355 | 1.6355 | 1.5837 | 1.6320 |
| Nd3 | 1.6355 | 1.6355 | 1.6355 | 1.6142 | 1.6355 | 1.6142 | 1.6355 | 1.6142 | 1.5850 |
| r2 | −4.394 | −4.393 | −4.610 | −4.609 | −4.538 | −4.803 | −4.905 | −4.847 | −11.391 |
| r3 | −2.109 | −2.102 | −2.073 | −2.076 | −2.083 | −2.072 | −2.135 | −2.136 | −2.046 |

TABLE 10-continued

| Values of respective parameters | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| r4 | −320.133 | −212.277 | −87.461 | −87.898 | −320.118 | −76.565 | −317.746 | −33.794 | −23.588 |
| f | 4.114 | 4.113 | 4.106 | 4.109 | 4.111 | 4.120 | 4.027 | 3.973 | 3.998 |
| f1 | 2.516 | 2.516 | 2.515 | 2.513 | 2.508 | 2.529 | 2.618 | 2.728 | 2.857 |
| f2 | −3.342 | −3.343 | −3.345 | −3.350 | −3.300 | −3.356 | −3.384 | −3.918 | −3.562 |
| f4 | 2.583 | 2.583 | 2.586 | 2.582 | 2.583 | 2.558 | 2.510 | 2.432 | 2.553 |
| f1234 | 2.620 | 2.611 | 2.615 | 2.612 | 2.593 | 2.591 | 2.564 | 2.487 | 2.566 |
| TTL | 4.880 | 4.878 | 4.868 | 4.874 | 4.858 | 4.872 | 4.850 | 4.788 | 4.844 |
| IH | 2.87 | 2.87 | 2.87 | 2.87 | 2.87 | 2.87 | 2.87 | 2.87 | 2.87 |
| ω | 35.54 | 34.48 | 34.48 | 34.48 | 34.34 | 34.41 | 35.05 | 35.36 | 35.19 |

Table 11 shows the values of respective conditional expressions (1) through (13) according to Embodiments 1 through 9.

TABLE 11

| Values of conditional expressions | Embodiment 1 | Embodiment 2 | Embodiment 3 | Embodiment 4 | Embodiment 5 | Embodiment 6 | Embodiment 7 | Embodiment 8 | Embodiment 9 |
|---|---|---|---|---|---|---|---|---|---|
| (1) 50 < ν1 < 85 | 56.16 | 56.16 | 56.16 | 56.16 | 56.16 | 56.16 | 55.87 | 81.61 | 55.95 |
| (2) 20 < ν2 < 35 | 23.91 | 23.91 | 23.91 | 23.91 | 23.91 | 23.91 | 23.91 | 30.13 | 23.40 |
| (3) 1.55 < Nd2 < 1.70 | 1.6355 | 1.6355 | 1.6355 | 1.6355 | 1.6355 | 1.6355 | 1.6355 | 1.5837 | 1.6320 |
| (4) 2.0 < ν1/ν2 < 3.0 | 2.349 | 2.349 | 2.349 | 2.349 | 2.349 | 2.349 | 2.337 | 2.708 | 2.391 |
| (5) 20 < ν3 < 30 | 23.91 | 23.91 | 23.91 | 25.58 | 23.91 | 25.58 | 23.91 | 25.58 | 29.90 |
| (6) 50 < ν4 < 60 | 56.16 | 56.16 | 56.16 | 56.16 | 56.16 | 56.16 | 56.16 | 56.16 | 55.95 |
| (7) 1.5 < Nd3 < 1.7 | 1.635 | 1.635 | 1.635 | 1.614 | 1.635 | 1.614 | 1.635 | 1.614 | 1.585 |
| (8) 1.8 < ν4/ν3 < 2.5 | 2.349 | 2.349 | 2.349 | 2.196 | 2.349 | 2.196 | 2.349 | 2.196 | 1.871 |
| (9) 1.0 < \|(r3 + r4)/(r3 − r4)\| < 1.3 | 1.013 | 1.020 | 1.049 | 1.048 | 1.013 | 1.056 | 1.014 | 1.135 | 1.190 |
| (10) 1.7 < r2/r3 < 6.0 | 2.083 | 2.090 | 2.224 | 2.221 | 2.179 | 2.318 | 2.297 | 2.269 | 5.569 |
| (11) 0.5 < f1/f < 0.8 | 0.612 | 0.612 | 0.613 | 0.612 | 0.610 | 0.614 | 0.650 | 0.687 | 0.715 |
| (12) −1.1 < f2/f < −0.7 | −0.812 | −0.813 | −0.815 | −0.815 | −0.803 | −0.815 | −0.840 | −0.986 | −0.891 |
| (13) 0.5 < f4/f < 0.7 | 0.62790 | 0.62798 | 0.62988 | 0.62839 | 0.62841 | 0.62079 | 0.62335 | 0.61205 | 0.63845 |
| TTL/2IH | 0.850 | 0.850 | 0.848 | 0.849 | 0.846 | 0.849 | 0.845 | 0.834 | 0.844 |

It can be seen that according to the image pickup lens of the embodiments of the present invention, the ratio of the total track length TTL to the maximum image height IH (TTL/2IH) is approximately 0.85, so that thinning is achieved, and that the total track length is shortened even by adopting a five-lens configuration. Moreover, the F-number is as bright as 2.25, the half angle of field ω is approximately 35°, which means that the lens enables to take an image having a relatively wide angle of field, with aberrations corrected satisfactorily.

INDUSTRIAL APPLICABILITY

As described, by applying the image pickup lens having a five-lens configuration according to the respective embodiments of the present invention to optical systems built into image pickup devices mounted on portable terminals such as cellular phones and smartphones, PDAs (Personal Digital Assistances) and game machines, enhanced performance and downsizing of the camera can be achieved simultaneously.

The effects of the present invention are as follows.

The present invention enables to provide an image pickup lens where various aberrations are corrected preferably, which can realize thinning, which has a relatively wide angle of field, and which is bright.

What is claimed is:

1. An image pickup lens composed of five lenses for a solid imaging element, comprising, in order from an object side to an image side, a first lens having a positive refractive power with a convex surface facing the object side, a second lens having a negative refractive power, a third lens as a meniscus lens with a concave surface facing the image side, a fourth lens as a meniscus lens with a convex surface facing the image side, and a fifth lens having both sides formed as aspherical surfaces and having a negative refractive power with a concave surface facing the object side and the image side near an optical axis;

wherein conditional expressions (9) and (12) below are satisfied:

$$1.0 < |(r3+r4)/(r3-r4)| < 1.3 \quad (9)$$

$$-1.1 < f2/f < -0.7 \quad (12)$$

where r3 represents a curvature radius of an object-side surface of the second lens, r4 represents a curvature radius of an image-side surface of the second lens, f represents a focal length of the overall optical system of the image pickup lens, and f2 represents a focal length of the second lens.

2. The image pickup lens according to claim 1, wherein an aperture stop is arranged between the first lens and the second lens.

3. The image pickup lens according to claim 1, wherein the second lens has a negative refractive power and a meniscus shape with a convex surface on the image side.

4. The image pickup lens according to claim 1, wherein the third lens and the fourth lens each have a positive refractive power.

5. The image pickup lens according to claim 1, satisfying the following conditional expressions (1), (2), and (3)

$$50 < v1 < 85 \quad (1)$$

$$20 < v2 < 35 \quad (2)$$

$$1.55 < Nd2 < 1.70 \quad (3)$$

where v1 represents an Abbe number of the first lens, v2 represents an Abbe number of the second lens, and Nd2 represents a refractive index of the second lens at d-ray.

6. The image pickup lens according to claim 1, satisfying the following conditional expressions (5), (6), and (7):

$$20 < v3 < 30 \quad (5)$$

$$50 < v4 < 60 \quad (6)$$

$$1.5 < Nd3 < 1.7 \quad (7)$$

where v3 represents an Abbe number of the third lens, v4 represents an Abbe number of the fourth lens, and Nd3 represents a refractive index of the third lens at d-ray.

7. The image pickup lens according to claim 1, wherein the image-side aspheric surface of the fifth lens has a pole-change point off the optical axis.

8. The image pickup lens according to claim 1, satisfying the following conditional expression (10):

$$1.7 < r2/r3 < 6.0 \quad (10)$$

where r2 represents a curvature radius of an image-side surface of the first lens, and r3 represents a curvature radius of the object-side surface of the second lens.

9. The image pickup lens according to claim 1, satisfying the following conditional expression (11):

$$0.5 < f1/f < 0.8 \quad (11)$$

where f represents a focal length of the overall optical system of the image pickup lens, and f1 represents a focal length of the first lens.

10. The image pickup lens according to claim 1, satisfying the following conditional expression (13):

$$0.5 < f4/f < 0.7 \quad (13)$$

where f represents a focal length of the overall optical system of the image pickup lens, and f4 represents a focal length of the fourth lens.

* * * * *